(12) United States Patent
Numata et al.

(10) Patent No.: US 10,746,441 B2
(45) Date of Patent: Aug. 18, 2020

(54) HEAT EXCHANGER

(71) Applicant: Daikin Applied Americas Inc., Minneapolis, MN (US)

(72) Inventors: Mitsuharu Numata, Plymouth, MN (US); Michael Wilson, Plymouth, MN (US); Jeffrey Majkowski, Brooklyn Park, MN (US)

(73) Assignee: DAIKIN APPLIED AMERICAS INC., Minneapolis, MN (US)

( * ) Notice: Subject to any disclaimer, the term of this patent is extended or adjusted under 35 U.S.C. 154(b) by 267 days.

(21) Appl. No.: 15/062,939

(22) Filed: Mar. 7, 2016

(65) Prior Publication Data

US 2017/0254573 A1 Sep. 7, 2017

(51) Int. Cl.
*F25B 39/02* (2006.01)
*F28D 7/16* (2006.01)
(Continued)

(52) U.S. Cl.
CPC ............ *F25B 39/028* (2013.01); *F25B 39/00* (2013.01); *F25B 43/00* (2013.01); *F28D 3/04* (2013.01);
(Continued)

(58) Field of Classification Search
CPC ........ F25B 43/00; F25B 39/00; F25B 39/028; F28D 3/04; F28D 5/02; F28D 7/16; F28D 7/1646; F28F 9/026
(Continued)

(56) References Cited

U.S. PATENT DOCUMENTS 4,702,308 A * 10/1987 Noe ...................... F28F 9/0202
165/158
5,645,124 A 7/1997 Hartfield et al.
(Continued)

FOREIGN PATENT DOCUMENTS

CN 1249032 A 3/2000
CN 1492206 A 4/2004
(Continued)

OTHER PUBLICATIONS

Partial English Machine Translation JP-2014020752. Accessed Sep. 11, 2019.*
(Continued)

*Primary Examiner* — Tavia Sullens
(74) *Attorney, Agent, or Firm* — Global IP Counselors, LLP

(57) ABSTRACT

A heat exchanger includes a shell, a refrigerant distributor, and a heat transferring unit. The shell has a refrigerant inlet through which at least refrigerant with liquid refrigerant flows and a shell refrigerant vapor outlet. A longitudinal center axis of the shell extends generally parallel to a horizontal plane. The refrigerant distributor is connected to the refrigerant inlet and disposed within the shell. The refrigerant distributor has at least one liquid refrigerant distribution opening that distributes liquid refrigerant and a refrigerant vapor distribution outlet opening longitudinally spaced from the shell refrigerant vapor outlet. The heat transferring unit is disposed inside of the shell below the refrigerant distributor so that the liquid refrigerant discharged from the refrigerant distributor is supplied to the heat transferring unit.

20 Claims, 17 Drawing Sheets

(51) Int. Cl.
*F28D 5/02* (2006.01)
*F28D 3/04* (2006.01)
*F28D 21/00* (2006.01)
*F28F 9/02* (2006.01)
*F25B 39/00* (2006.01)
*F25B 43/00* (2006.01)

(52) U.S. Cl.
CPC .............. *F28D 5/02* (2013.01); *F28D 7/16* (2013.01); *F28D 7/1646* (2013.01); *F28F 9/026* (2013.01); *F25B 2339/0242* (2013.01); *F28D 2021/0064* (2013.01); *F28D 2021/0071* (2013.01)

(58) Field of Classification Search
USPC .......... 62/520, 521, 522, 525; 165/161, 159, 165/158, 157, 115, 116
See application file for complete search history.

(56) References Cited

U.S. PATENT DOCUMENTS

| | | | | |
|---|---|---|---|---|
| 6,293,112 | B1* | 9/2001 | Moeykens | F25B 39/02 62/525 |
| 2011/0017432 | A1* | 1/2011 | Kulankara | F28D 7/16 62/503 |
| 2015/0050378 | A1 | 2/2015 | Fujiwara et al. | |
| 2015/0053378 | A1 | 2/2015 | Numata et al. | |
| 2015/0168035 | A1 | 6/2015 | Kang et al. | |
| 2015/0292804 | A1* | 10/2015 | Hermida Dominguez | F28F 21/084 165/167 |
| 2017/0138652 | A1* | 5/2017 | Hattori | F25B 39/02 |
| 2017/0153061 | A1* | 6/2017 | Yoshioka | F28D 21/0017 |

FOREIGN PATENT DOCUMENTS

| | | | | | |
|---|---|---|---|---|---|
| DE | | 3315250 A1 | * | 10/1984 | ........... F28D 7/1653 |
| JP | | 2014-20724 A | | 2/2014 | |
| JP | | 2014020752 A | * | 2/2014 | |
| WO | WO-2016002723 A1 | * | 1/2016 | .............. F25B 39/02 |
| WO | WO-2016002784 A1 | * | 1/2016 | ................ F28F 9/00 |

OTHER PUBLICATIONS

The International Search Report for the corresponding international application No. PCT/US2017/020416 dated May 18, 2017.
International Preliminary Report on Patentability including Written Opinion for the corresponding international application No. PCT/US2017/020416, dated Sep. 11, 2018.
communication pursuant to Article 94(3) EPC for the corresponding European application No. 17 711 466.7, dated Jan. 21, 2020.

* cited by examiner

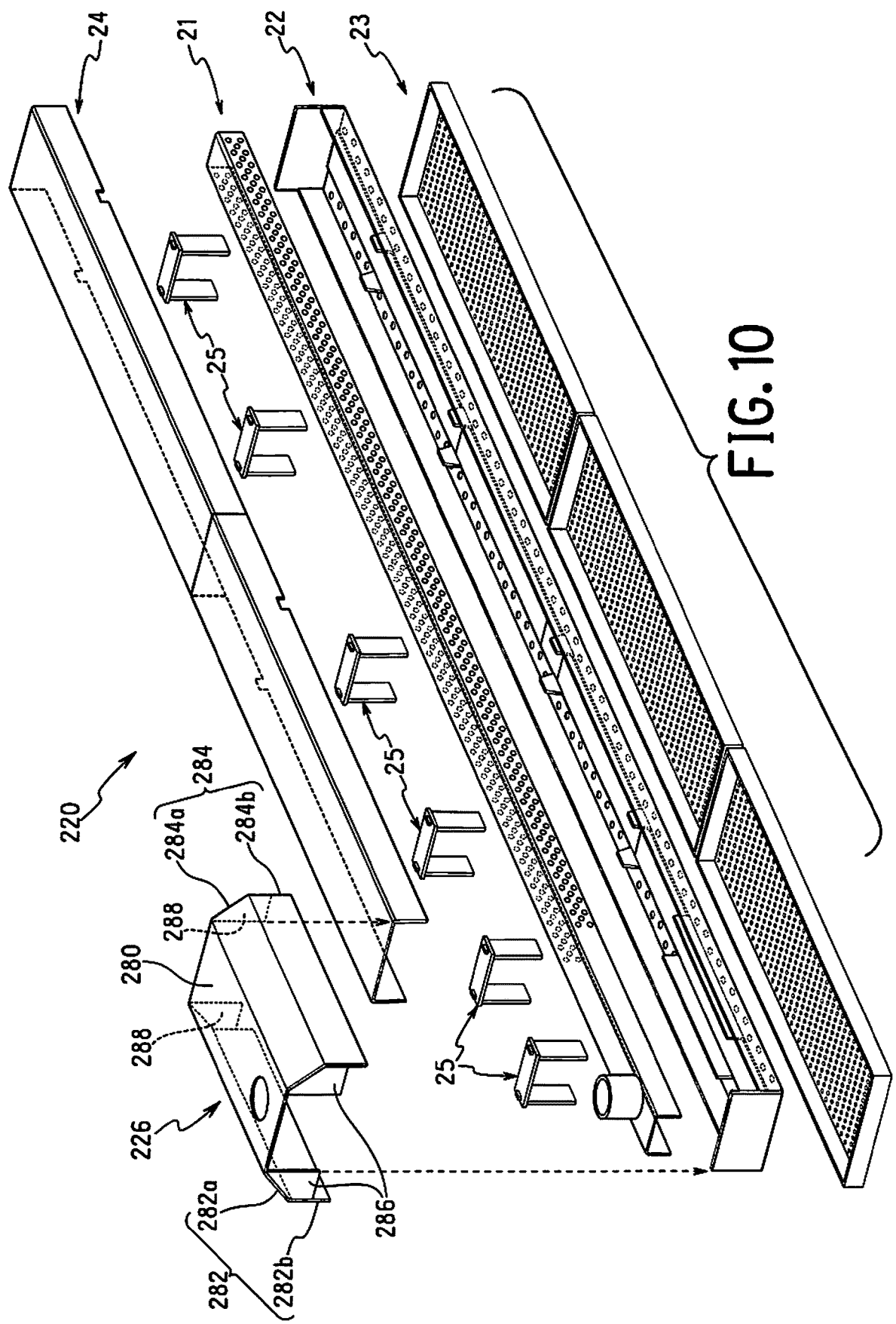

HEAT EXCHANGER

BACKGROUND OF THE INVENTION

Field of the Invention

This invention generally relates to a heat exchanger adapted to be used in a vapor compression system. More specifically, this invention relates to a heat exchanger including a refrigerant distributor.

Background Information

Vapor compression refrigeration has been the most commonly used method for air-conditioning of large buildings or the like. Conventional vapor compression refrigeration systems are typically provided with an evaporator, which is a heat exchanger that allows the refrigerant to evaporate from liquid to vapor while absorbing heat from liquid to be cooled passing through the evaporator. One type of evaporator includes a tube bundle having a plurality of horizontally extending heat transfer tubes through which the liquid to be cooled is circulated, and the tube bundle is housed inside a cylindrical shell. There are several known methods for evaporating the refrigerant in this type of evaporator. In a flooded evaporator, the shell is filled with liquid refrigerant and the heat transfer tubes are immersed in a pool of the liquid refrigerant so that the liquid refrigerant boils and/or evaporates as vapor. In a falling film evaporator, liquid refrigerant is deposited onto exterior surfaces of the heat transfer tubes from above so that a layer or a thin film of the liquid refrigerant is formed along the exterior surfaces of the heat transfer tubes. Heat from walls of the heat transfer tubes is transferred via convection and/or conduction through the liquid film to the vapor-liquid interface where part of the liquid refrigerant evaporates, and thus, heat is removed from the water flowing inside of the heat transfer tubes. The liquid refrigerant that does not evaporate falls vertically from the heat transfer tube at an upper position toward the heat transfer tube at a lower position by force of gravity. There is also a hybrid falling film evaporator, in which the liquid refrigerant is deposited on the exterior surfaces of some of the heat transfer tubes in the tube bundle and the other heat transfer tubes in the tube bundle are immersed in the liquid refrigerant that has been collected at the bottom portion of the shell.

Although the flooded evaporators exhibit high heat transfer performance, the flooded evaporators require a considerable amount of refrigerant because the heat transfer tubes are immersed in a pool of the liquid refrigerant. With the recent development of new and high-cost refrigerant having a much lower global warming potential (such as R1234ze or R1234yf), it is desirable to reduce the refrigerant charge in the evaporator. The main advantage of the falling film evaporators is that the refrigerant charge can be reduced while ensuring good heat transfer performance. Therefore, the falling film evaporators have a significant potential to replace the flooded evaporators in large refrigeration systems. Regardless of the type of evaporator, e.g., flooded, falling film, or hybrid, a distributor is provided to distribute refrigerant entering the evaporator to the tube bundle. U.S patent publication No. 2015/0053378 discloses one example of such a distributor. The distributor is designed to separate vapor refrigerant from liquid refrigerant and distribute liquid refrigerant toward the tube bundle. Particularly in the case of a falling film type evaporator such distribution is desired.

SUMMARY OF THE INVENTION

In at least a falling film evaporator it has been discovered that it is desirable for as much as possible of the liquid refrigerant be separated from the gas refrigerant in the distributor so that only liquid refrigerant is distributed to the tube bundle.

Therefore one object of the present invention is to provide an evaporator with a distributor that sufficiently separates liquid and gas refrigerant.

It has been further discovered that if gas liquid separation in the distributor is not sufficient, liquid droplets of refrigerant can be contained in the gas refrigerant. Such liquid droplets will not be distributed to the tube bundle and will exit the evaporator with exit vapor flow and be returned to the compressor. This phenomenon is called liquid carryover. This liquid carryover may reduce performance of the evaporator and/or compressor, and thus, the entire refrigerant cycle.

Therefore another object of the present invention is to provide an evaporator with a distributor that distributes liquid refrigerant to the tube bundle and reduces liquid droplet content (liquid carryover) in refrigerant exit vapor, and thus, improves performance of the evaporator and/or compressor.

It has been discovered that such a liquid carryover phenomenon is more prevalent in a case where the vessel is long, the vapor outlet is in an end of the evaporator, and/or vapor velocity becomes high. Because vapor velocity within the body becomes uneven, vapor velocity in the distributor is increased when the vapor velocity of the vapor outlet side neighborhood exceeds the threshold. In other words, in a case where an inlet is disposed at one end of the distributor, a vapor outlet is disposed at another end of the distributor, and the distributor and vessel are relatively long; it has been discovered that gas or vapor velocity can increase from the inlet end to the outlet end of the distributor and evaporator.

Therefore yet another object of the present invention is to provide an evaporator with a distributor that can achieve any of the above objects even when the vessel is long, the vapor outlet is in an end of the evaporator, and/or vapor velocity becomes high.

It has also been discovered that such a liquid carryover phenomenon can be more prevalent in a case where a Low Pressure Refrigerant LPR refrigerant is used because a low pressure refrigerant may have a lower vapor density.

Therefore yet another object of the present invention is to provide an evaporator with a distributor that reduces liquid carryover even when LPR refrigerant is used.

Yet another object of the present invention is to provide an evaporator with a distributor with a relatively simple structure.

A heat exchanger according to a first aspect of the present invention is adapted to be used in a vapor compression system. The heat exchanger includes a shell, a refrigerant distributor, and a heat transferring unit. The shell has a refrigerant inlet through which at least refrigerant with liquid refrigerant flows and a shell refrigerant vapor outlet. A longitudinal center axis of the shell extends generally parallel to a horizontal plane. The refrigerant distributor is connected to the refrigerant inlet and disposed within the shell. The refrigerant distributor has at least one liquid refrigerant distribution opening that distributes liquid refrigerant and a refrigerant vapor distribution outlet opening longitudinally spaced from the shell refrigerant vapor outlet. The heat transferring unit is disposed inside of the shell below the refrigerant distributor so that the liquid refrigerant discharged from the refrigerant distributor is supplied to the heat transferring unit.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 10 is a simplified exploded perspective view of an internal structure of a refrigerant distributor of a heat exchanger in accordance with a second embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figures 1, 2:
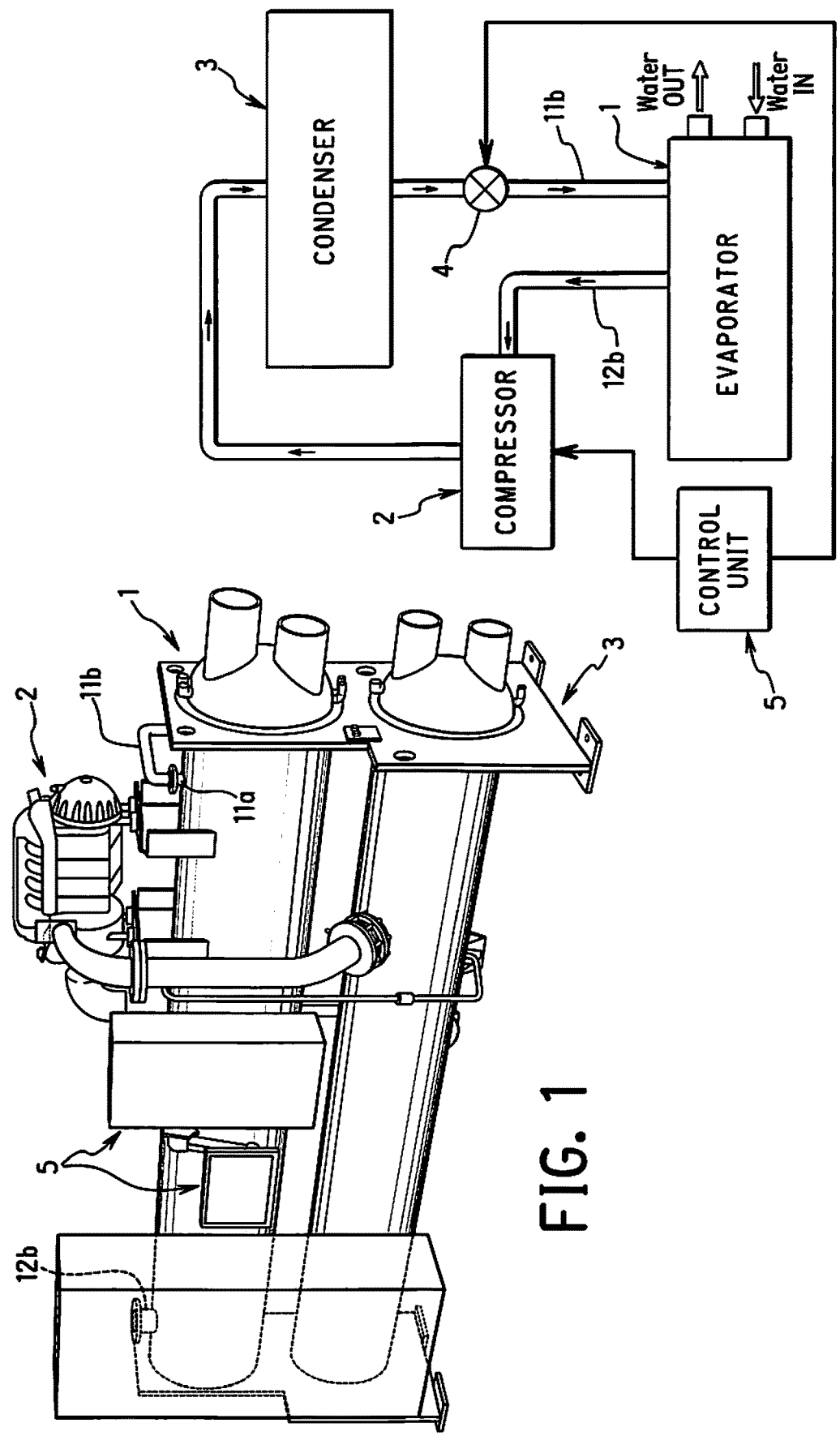
FIG. 1 is a simplified, overall perspective view of a vapor compression system including a heat exchanger according to a first embodiment of the present invention.
FIG. 2 is a block diagram illustrating a refrigeration circuit of the vapor compression system including the heat exchanger according to the first embodiment of the present invention.

Referring initially to FIGS. 1 and 2, a vapor compression system including a heat exchanger according to a first embodiment will be explained. As seen in FIG. 1, the vapor compression system according to the first embodiment is a chiller that may be used in a heating, ventilation and air conditioning (HVAC) system for air-conditioning of large buildings and the like. The vapor compression system of the first embodiment is configured and arranged to remove heat from liquid to be cooled (e.g., water, ethylene glycol, calcium chloride brine, etc.) via a vapor-compression refrigeration cycle.

As shown in FIGS. 1 and 2, the vapor compression system includes the following four main components: an evaporator 1, a compressor 2, a condenser 3, an expansion device 4, and a control unit 5. The control unit 5 is operatively coupled to a drive mechanism of the compressor 2 and the expansion device 4 to control operation of the vapor compression system.

The evaporator 1 is a heat exchanger that removes heat from the liquid to be cooled (in this example, water) passing through the evaporator 1 to lower the temperature of the water as a circulating refrigerant evaporates in the evaporator 1. The refrigerant entering the evaporator 1 is typically in a two-phase gas/liquid state. The refrigerant at least includes liquid refrigerant. The liquid refrigerant evaporates as the vapor refrigerant in the evaporator 1 while absorbing heat from the water.

The low pressure, low temperature vapor refrigerant is discharged from the evaporator 1 and enters the compressor 2 by suction. In the compressor 2, the vapor refrigerant is compressed to the higher pressure, higher temperature vapor. The compressor 2 may be any type of conventional compressor, for example, centrifugal compressor, scroll compressor, reciprocating compressor, screw compressor, etc.

Next, the high temperature, high pressure vapor refrigerant enters the condenser 3, which is another heat exchanger that removes heat from the vapor refrigerant causing it to condense from a gas state to a liquid state. The condenser 3 may be an air-cooled type, a water-cooled type, or any suitable type of condenser. The heat raises the temperature of cooling water or air passing through the condenser 3, and the heat is rejected to outside of the system as being carried by the cooling water or air.

The condensed liquid refrigerant then enters through the expansion device 4 where the refrigerant undergoes an abrupt reduction in pressure. The expansion device 4 may be as simple as an orifice plate or as complicated as an electronic modulating thermal expansion valve. Whether the expansion device 4 is connected to the control unit will depend on whether a controllable expansion device 4 is utilized. The abrupt pressure reduction usually results in partial evaporation of the liquid refrigerant, and thus, the refrigerant entering the evaporator 1 is usually in a two-phase gas/liquid state.

Some examples of refrigerants used in the vapor compression system are hydrofluorocarbon (HFC) based refrigerants, for example, R410A, R407C, and R134a, hydrofluoro olefin (HFO), unsaturated HFC based refrigerant, for example, R1234ze, and R1234yf, and natural refrigerants, for example, R717 and R718. R1234ze, and R1234yf are mid density refrigerants with densities similar to R134a. R450A and R513A are also possible refrigerants. A so-called Low Pressure Refrigerant (LPR) 1233zd is also a suitable type of refrigerant. Low Pressure Refrigerant (LPR) 1233zd is sometimes referred to as Low Density Refrigerant (LDR) because R1233zd has a lower vapor density than the other refrigerants mentioned above. R1233zd has a density lower than R134a, R1234ze, and R1234yf, which are so-called mid density refrigerants. The density being discussed here is vapor density not liquid density because R1233zd has a slightly higher liquid density than R134A. While the embodiment(s) disclosed herein are useful with any type of refrigerant, the embodiment(s) disclosed herein are particularly useful when used with LPR such as 1233zd. This is because a LPR such as R1233zd has a relatively lower vapor density than the other options, which leads to higher velocity vapor flow. Higher velocity vapor flow in a conventional device used with LPR such as R1233zd can lead to liquid carryover as mentioned in the Summary above. While individual refrigerants are mentioned above, it will be apparent to those skilled in the art from this disclosure that a combination refrigerant utilizing any two or more of the above refrigerants may be used. For example, a combined refrigerant including only a portion as R1233zd could be utilized.

It will be apparent to those skilled in the art from this disclosure that conventional compressor, condenser and expansion device may be used respectively as the compressor 2, the condenser 3 and the expansion device 4 in order to carry out the present invention. In other words, the compressor 2, the condenser 3 and the expansion device 4 are conventional components that are well known in the art. Since the compressor 2, the condenser 3 and the expansion device 4 are well known in the art, these structures will not be discussed or illustrated in detail herein. The vapor compression system may include a plurality of evaporators 1, compressors 2 and/or condensers 3.

Referring now to FIGS. 3-9, the detailed structure of the evaporator 1, which is the heat exchanger according to the first embodiment, will be explained. The evaporator 1 basically includes a shell 10, a refrigerant distributor 20, and a heat transferring unit 30. In the illustrated embodiment, the heat transferring unit 30 is a tube bundle. Thus, the heat transferring unit 30 will also be referred to as the tube bundle 30 herein. However, it will be apparent to those skilled in the art from this disclosure that other structures for the heat transferring unit 30 may be used without departing from the scope of the present invention. Refrigerant enters the shell 10 and is supplied to the refrigerant distributor 20. Then refrigerant distributor 20 performs gas liquid separation and supplies the liquid refrigerant onto the tube bundle 30, as explained in more detail below. Vapor refrigerant will exit the distributor 20 and flow into the interior of the shell 10, as also explained in more detail below.

Figure 3:
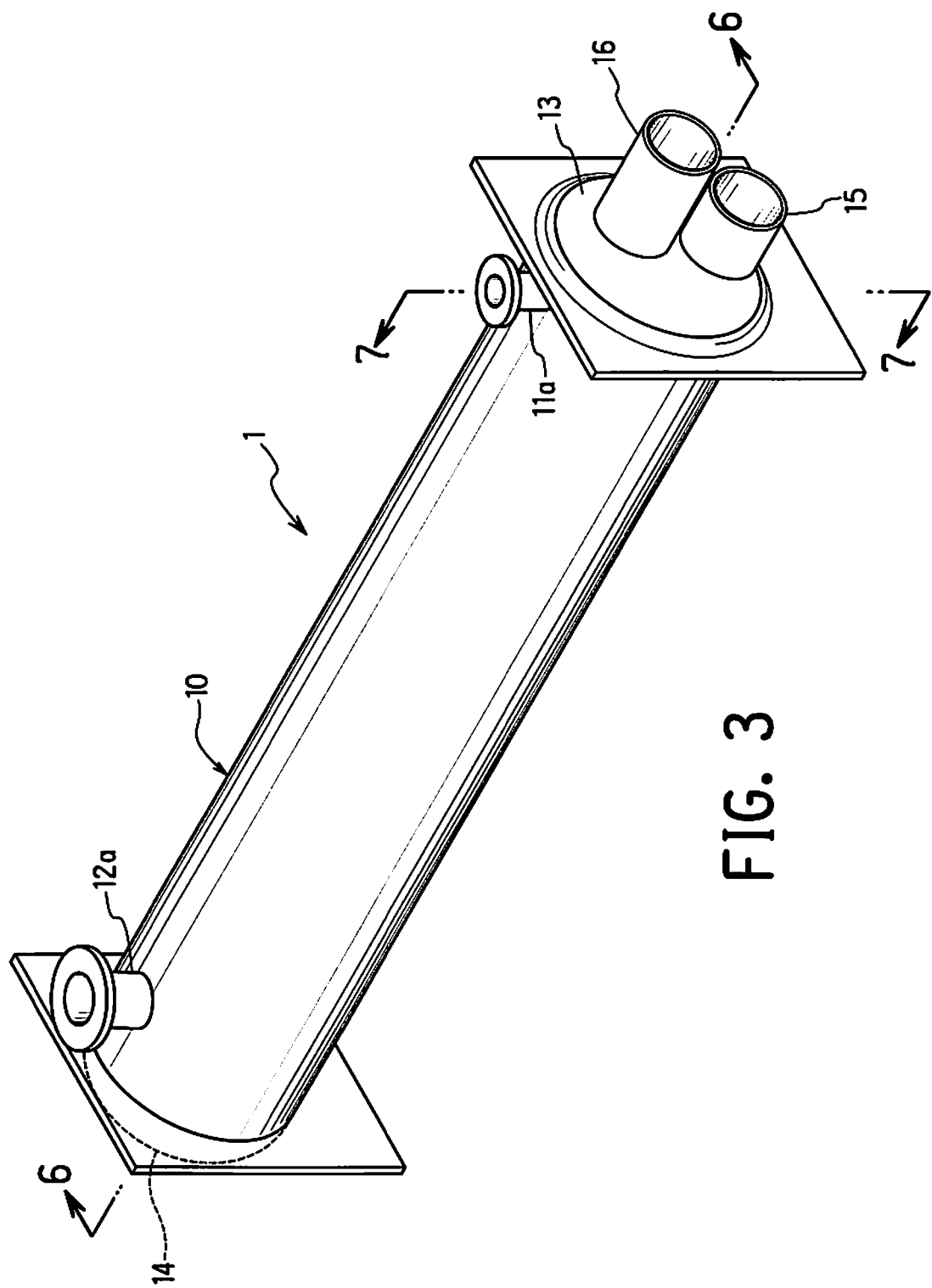
FIG. 3 is a simplified perspective view of the heat exchanger according to the first embodiment of the present invention.
Figure 6:
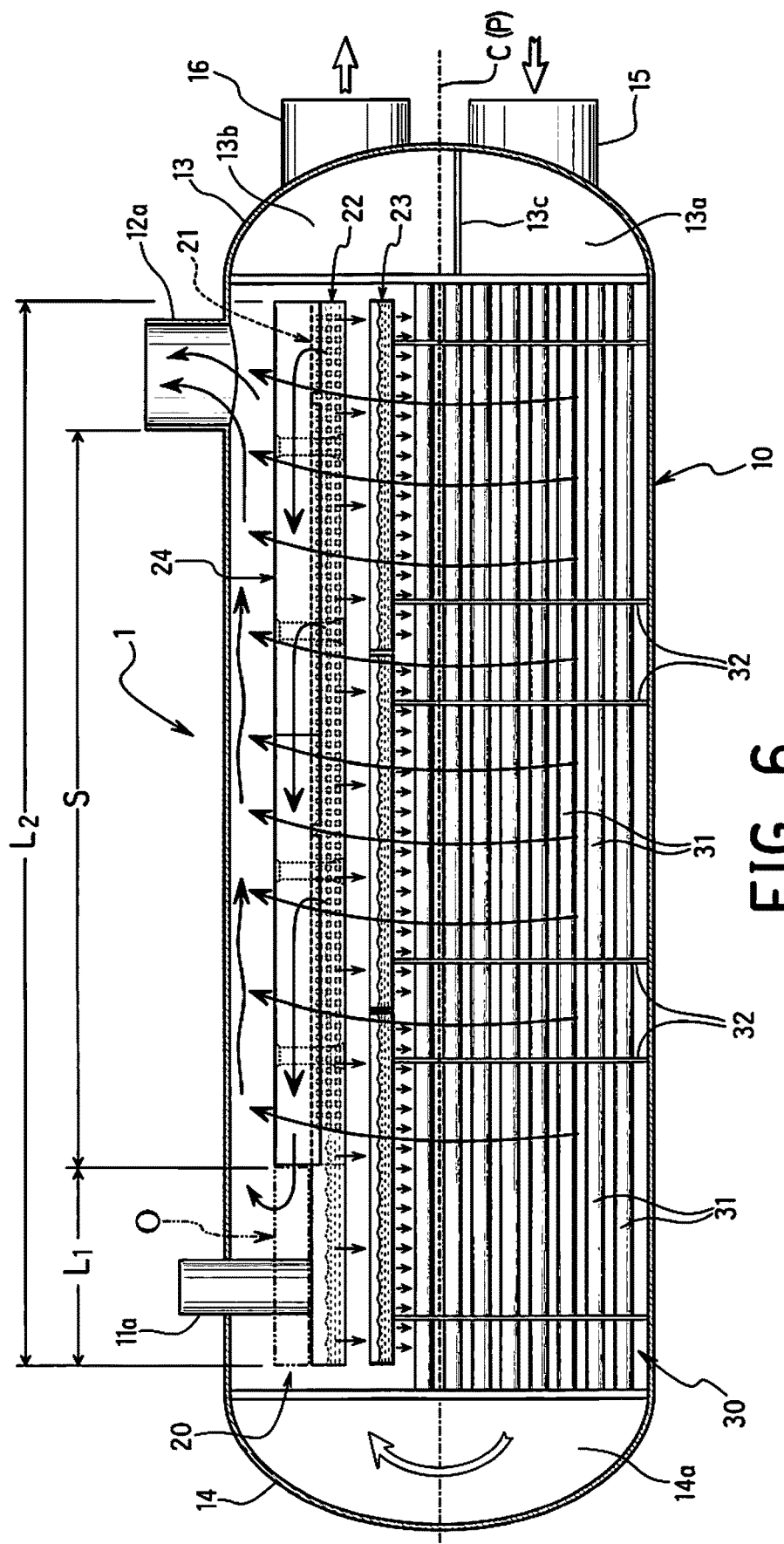
FIG. 6 is a simplified longitudinal cross sectional view of the heat exchanger illustrated in FIGS. 1-3, as taken along section line 6-6 in FIG. 3.
Figure 7:
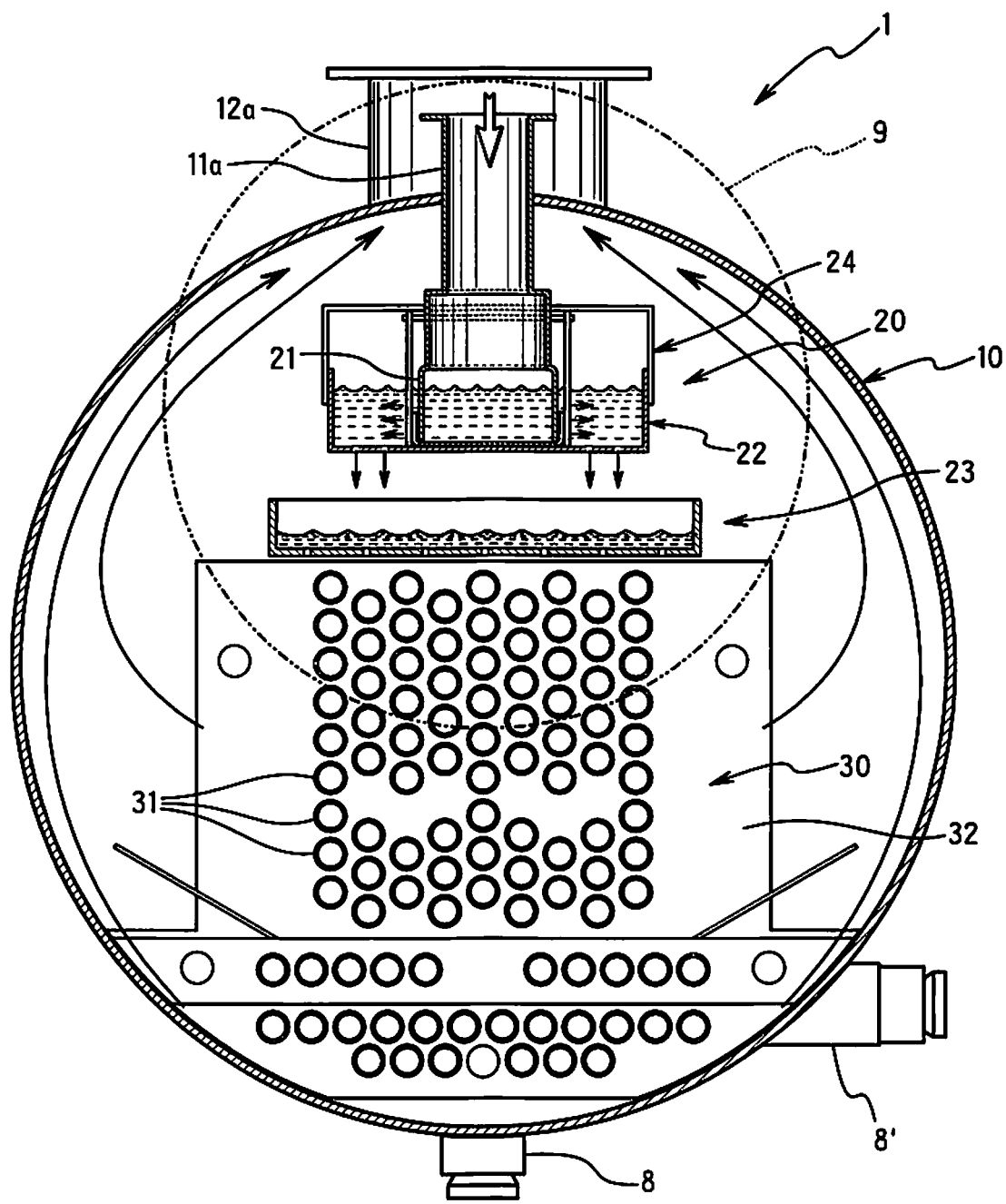
FIG. 7 is a simplified transverse cross sectional view of the heat exchanger illustrated in FIGS. 1-3, as taken along section line 7-7 in FIG. 3.
Figure 9:
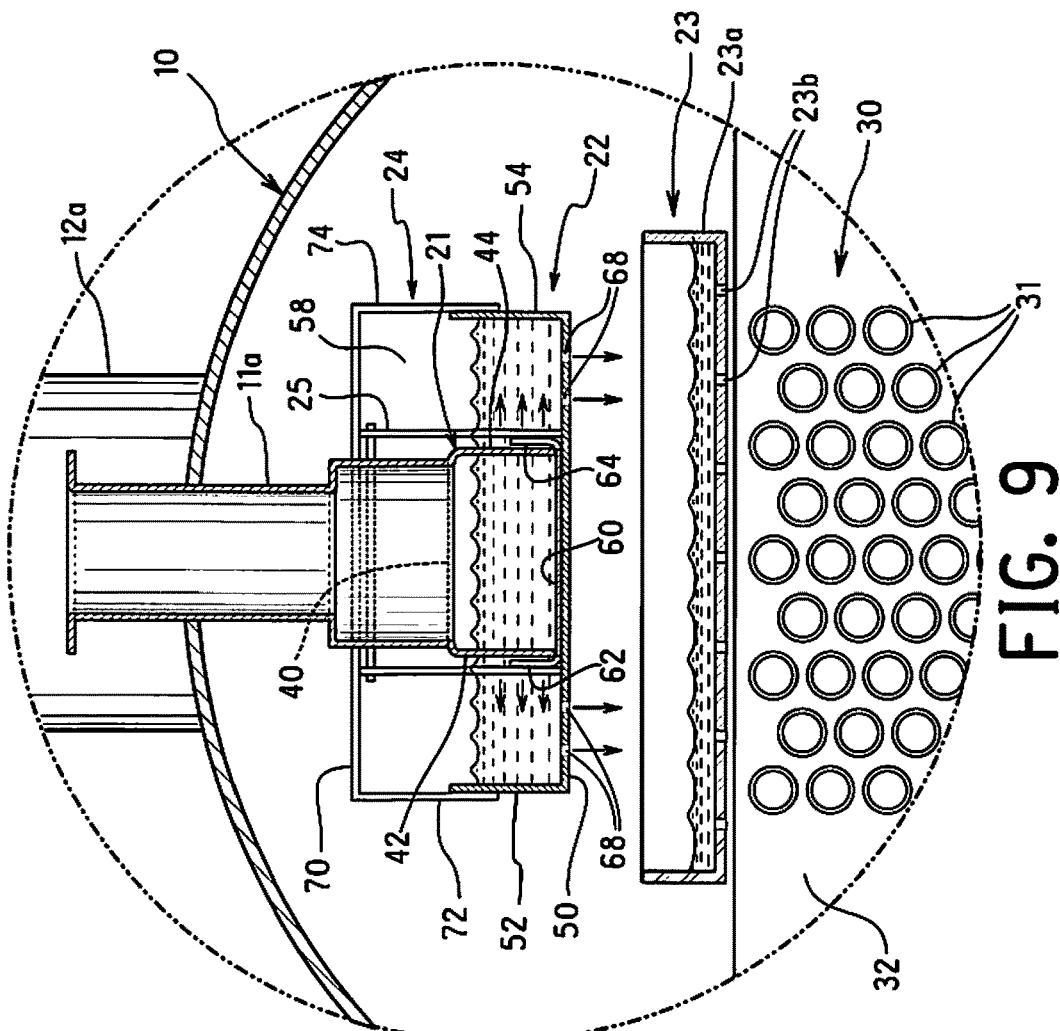
FIG. 9 is a further enlarged view of the circled section 9 in FIG. 7.
Figure 8:
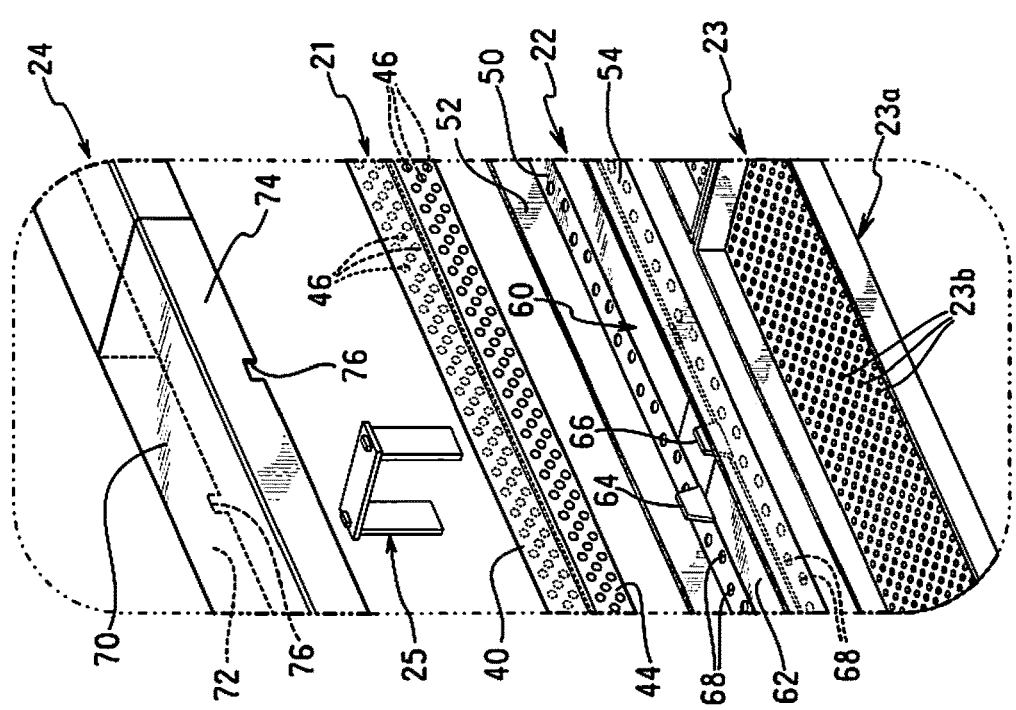
FIG. 8 is a further enlarged view of the circled section 8 in FIG. 4.
Figure 11:
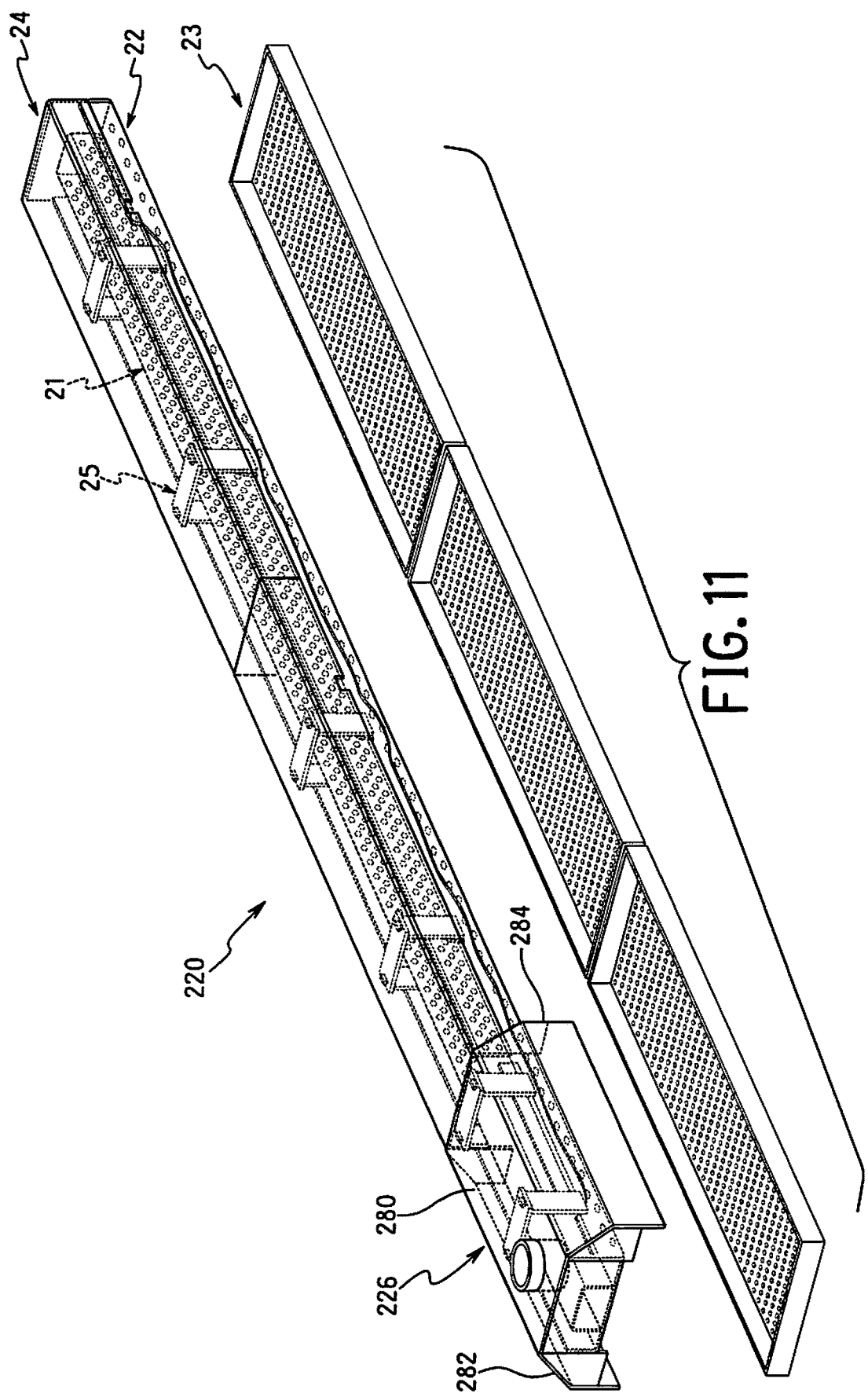
FIG. 11 is a simplified partially exploded perspective view of the internal structure of the refrigerant distributor illustrated in FIG. 10.
Figure 12:
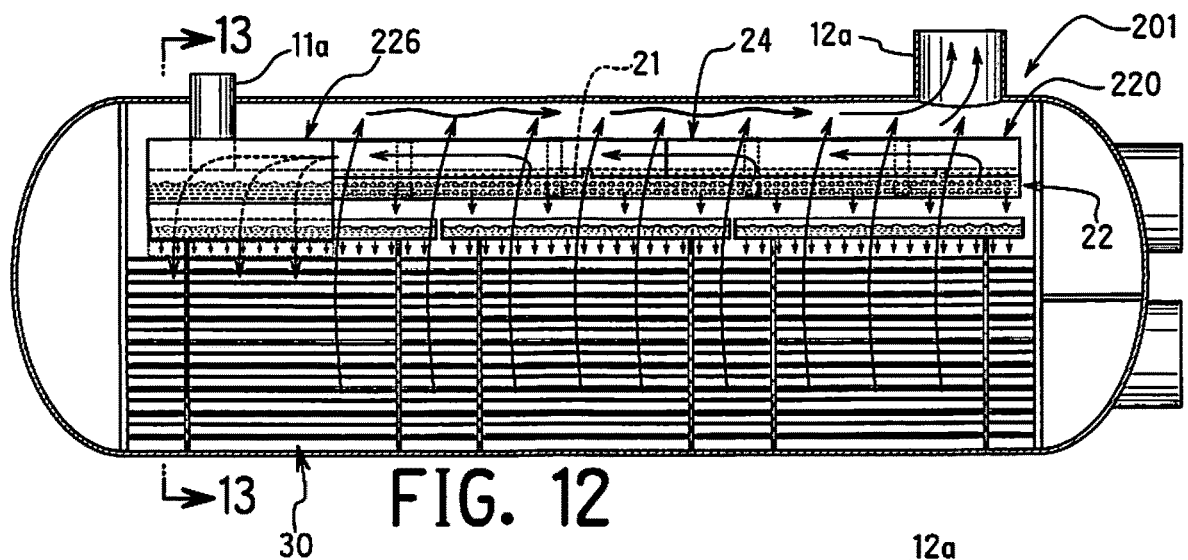
FIG. 12 is a simplified longitudinal cross sectional view of the heat exchanger and distributor illustrated in FIGS. 10-11 in accordance with the second embodiment, as taken along a section line like 6-6 in FIG. 3.
Figure 13:
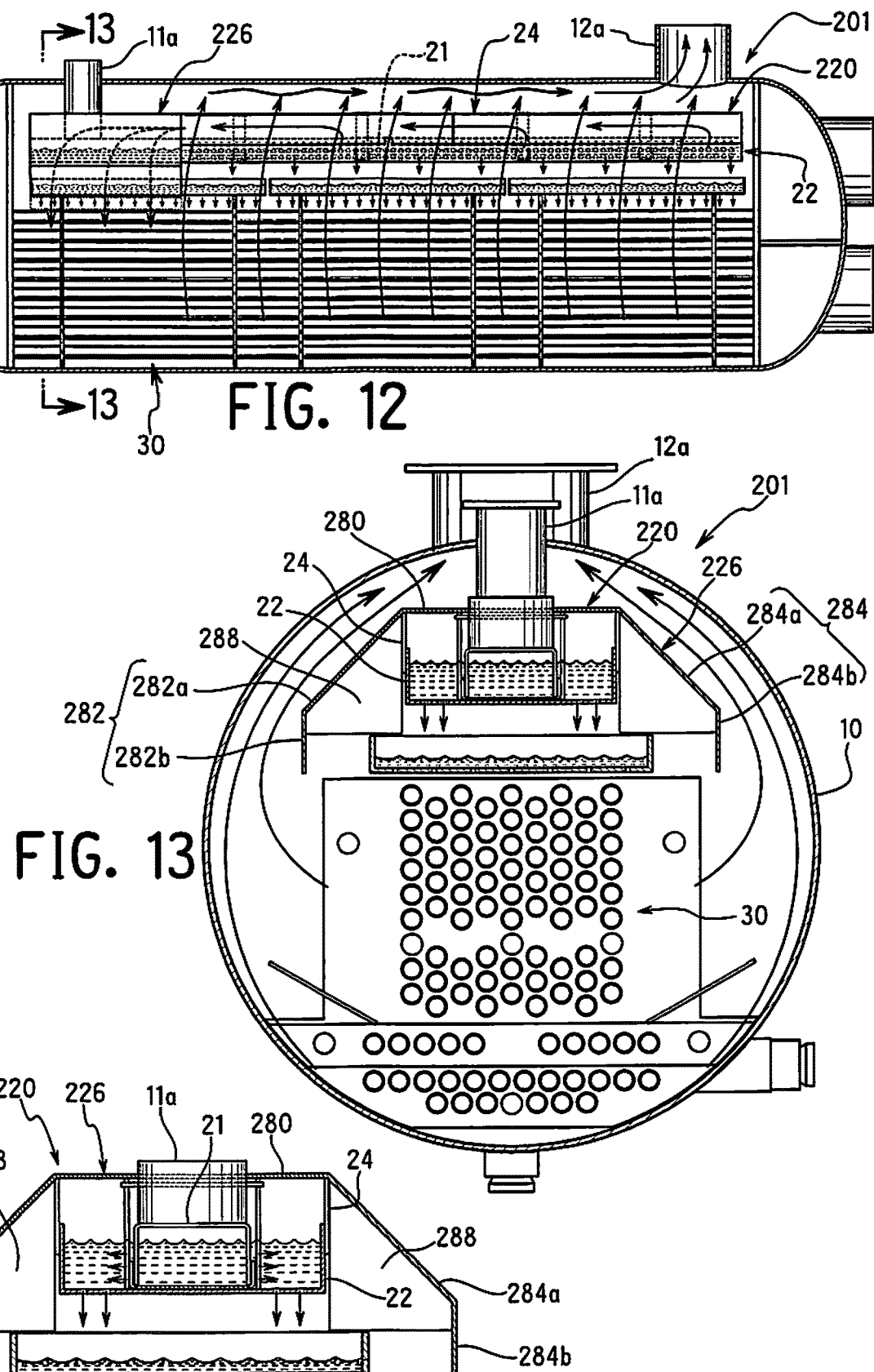
FIG. 13 is a simplified transverse cross sectional view of the heat exchanger and distributor illustrated in FIGS. 10-12, as taken along a section line like 7-7 in FIG. 3.
Figure 14:
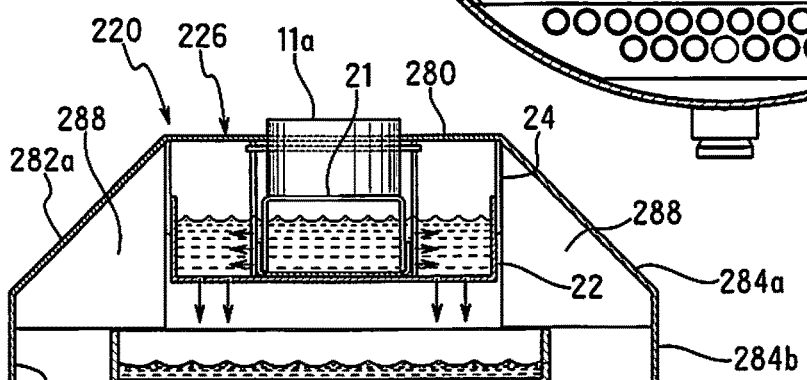
FIG. 14 is a further enlarged view of part of FIG. 13.

As best understood from FIGS. 3, 6 and 7, in the illustrated embodiment, the shell 10 has a generally cylindrical shape with a longitudinal center axis C (FIG. 6) extending generally in the horizontal direction. Thus, the shell 10 extends generally parallel to a horizontal plane P. The shell 10 includes a connection head member 13 defining an inlet water chamber 13a and an outlet water chamber 13b, and a return head member 14 defining a water chamber 14a. The connection head member 13 and the return head member 14 are fixedly coupled to longitudinal ends of a cylindrical body of the shell 10. The inlet water chamber 13a and the outlet water chamber 13b are partitioned by a water baffle 13c. The connection head member 13 includes a water inlet pipe 15 through which water enters the shell 10 and a water outlet pipe 16 through which the water is discharged from the shell 10.

As shown in FIGS. 1, 2, 3 and 6, the shell 10 further includes a refrigerant inlet 11a connected to a refrigerant inlet pipe 11b and a shell refrigerant vapor outlet 12a connected to a refrigerant outlet pipe 12b. The refrigerant inlet pipe 11b is fluidly connected to the expansion device 4 to introduce the two-phase refrigerant into the shell 10. The expansion device 4 may be directly coupled at the refrigerant inlet pipe 11b. The liquid component in the two-phase refrigerant boils and/or evaporates in the evaporator 1 and goes through phase change from liquid to vapor as it absorbs heat from the water passing through the evaporator 1. The vapor refrigerant is drawn from the refrigerant outlet pipe 12b to the compressor 2 by suction. The refrigerant that enters the refrigerant inlet 11a includes at least liquid refrigerant. Often the refrigerant entering the refrigerant inlet 11a is two-phase refrigerant. From the refrigerant inlet 11a the refrigerant flows into the refrigerant distributor 20, which distributes the liquid refrigerant over the tube bundle 30.

Figure 4:
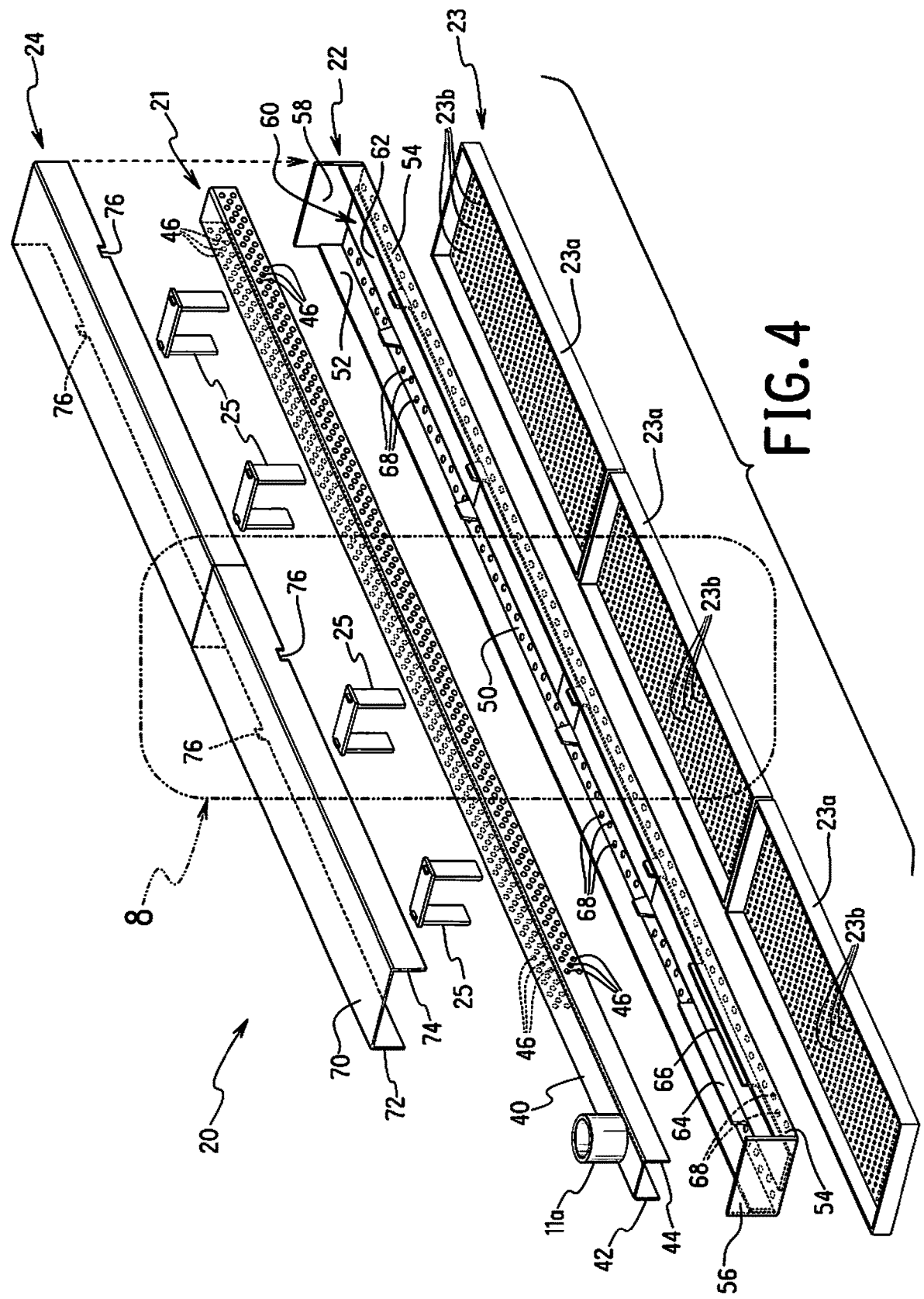
FIG. 4 is a simplified exploded perspective view of an internal structure of the refrigerant distributor of the heat exchanger illustrated in FIGS. 1-3.
Figure 5:
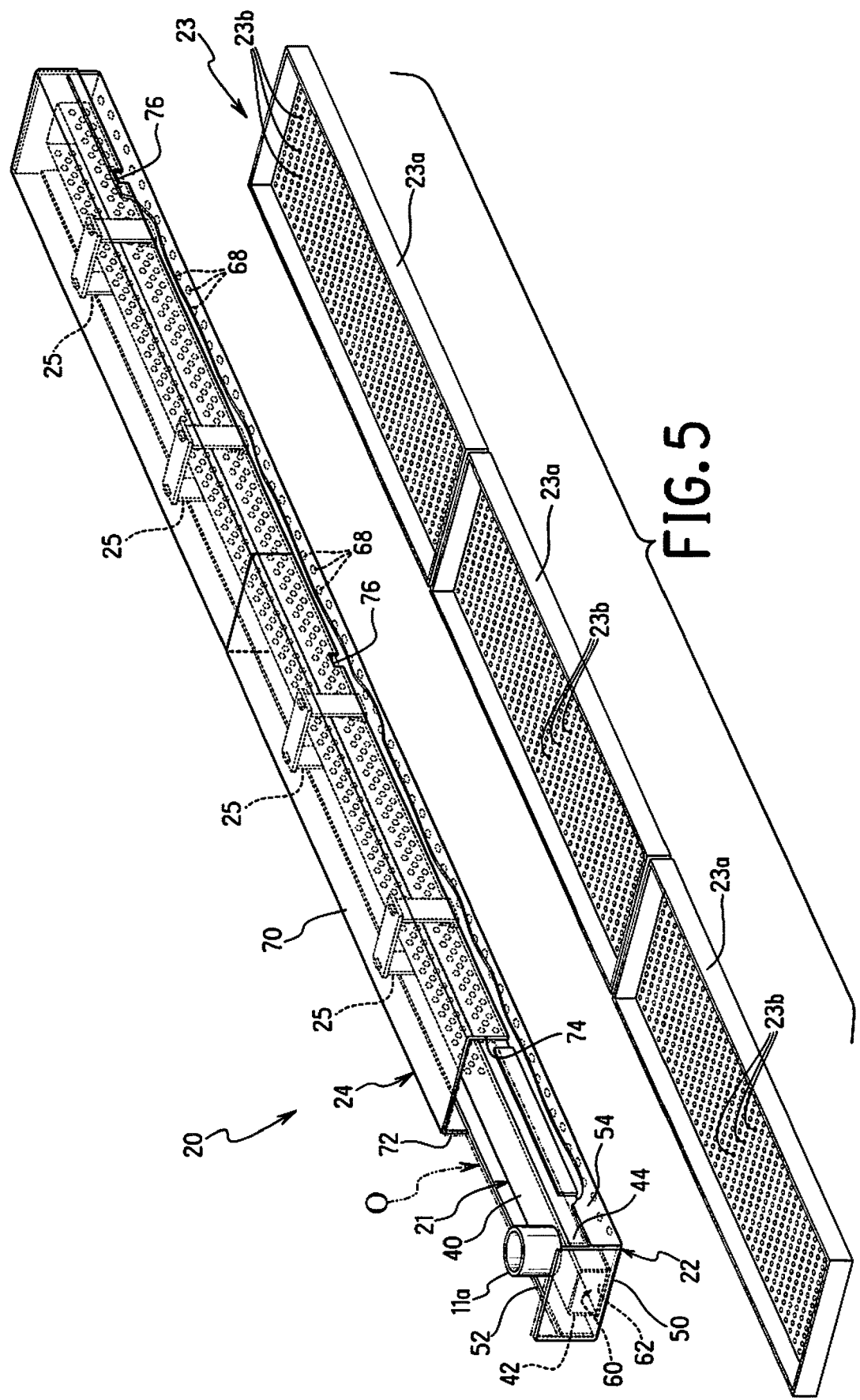
FIG. 5 is a simplified partially exploded perspective view of the internal structure of the refrigerant distributor of the heat exchanger illustrated in FIGS. 1-4.

Referring now to FIGS. 4-9, the refrigerant distributor 20 is connected to the refrigerant inlet 11a and is disposed within the shell 10. The refrigerant distributor 20 is configured and arranged to serve as both a gas-liquid separator and a liquid refrigerant distributor. The refrigerant distributor 20 extends longitudinally within the shell 10 generally parallel to the longitudinal center axis C of the shell 10. As best shown in FIGS. 4-5, the refrigerant distributor 20 includes an inlet channel part 21, a first tray part 22, a second tray element 23, and a second canopy part or second cover part 24. The inlet channel part 21, the first tray part 22 and the second canopy part 24 are rigidly connected together as best understood from FIGS. 5-7 and 9. The second tray element 23 is disposed below the first tray part 22. In the illustrated embodiment, the second tray element 23 is not attached to the inlet channel part 21, the first tray part 22 and the second canopy part 24. Rather, the second tray element 23 is supported by parts of the tube bundle 30, as explained in more detail below.

As shown in FIG. 6, the inlet channel part 21 extends generally parallel to the longitudinal center axis C of the shell 10 and the horizontal plane P. The inlet channel part 21 is fluidly connected to the refrigerant inlet pipe 11b via the refrigerant inlet 11a of the shell 10 so that the two-phase refrigerant is introduced into the inlet channel part 21. The inlet channel part 21 has an inverted U-shaped rectangular cross-sectional configuration. More specifically, the inlet channel part 21 has an inverted U-shape with its free ends fixedly connected to the first tray part 22. In the illustrated embodiment, the first tray part 22 has a structure that mates with the inlet channel part 21 to form part of tubular cross-sectional shape together with the inlet channel part 21.

Referring still to FIGS. 4-9, the inlet channel part 21 is fluidly connected to the refrigerant inlet pipe 11b via the refrigerant inlet 11a so that the two-phase refrigerant is introduced into the inlet channel part 21 from the refrigerant inlet pipe 11b as mentioned above. The inlet channel part 21 preferably includes an inlet top plate 40 and a pair of inlet lateral side plates 42 and 44. The inlet top plate 40 has a hole where the refrigerant inlet 11a is attached. The inlet lateral side plates 42 and 44 extend downwardly from the inlet top plate 40 to form an inverted U-shaped transverse cross-section. The inlet lateral side plates 42 and 44 can be divided into first sections without holes and second sections with holes 46. The inlet lateral side plates 42 and 44 are attached to the first tray part 22.

In the illustrated embodiment, the inlet top plate 40 and the inlet side plates 42 and 44 are each formed of a rigid metal sheet/plate material, which prevents liquid and gas refrigerant from passing therethrough unless holes 46 are formed therein. In addition, in the illustrated embodiment, the inlet top plate 40 and the inlet side plates 42 and 44 are integrally formed together as a one-piece unitary member. However, it will be apparent to those skilled in the art from this disclosure that these plates 40, 42 and 44 may be constructed as separate members, which are attached to each other using any conventional technique such as welding. In either case, the inlet plates 42 and 44 are attached to the longitudinal center of the first tray part 22. In addition, it will be apparent to those skilled in the art from this disclosure that at least portions of the lateral side plates 42 and 44 could be constructed at least partially of a metal mesh material so long as liquid and gas communication therethrough is possible.

In the illustrated embodiment, both inlet side plates 42 and 44 have holes formed continuously along their entire heights but only along a predetermined length shorter than the length of the second canopy part 24. However, it will be apparent to those skilled in the art from this disclosure that different patterns of holes can be used. For example holes 46 can be provided only above a predetermined height, or continuous flanges can be provided in the first tray 22 so that liquid refrigerant only exits the inlet channel part 21 above a certain level. In the illustrated embodiment, the inlet top plate 40 is rigidly attached to the refrigerant inlet 11a, and the inlet channel part 21 is fixed to the first tray part 22. The second canopy part 24 is attached to the first tray part 22 to overlie the areas with holes of the inlet lateral side plates 42 and 44, as explained in more detail below.

Referring still to FIGS. 4-9, the first tray part 22 will now be explained in more detail. The first tray part 22 includes a first bottom plate 50, a pair of first lateral side plates 52 and 54, a pair of first end plates 56 and 58 and a channel section 60. In the illustrated embodiment, the first lateral side plates 52 and 54 extend upwardly from the first bottom plate 50 to form a U-shape in transverse cross-section. The first end plates 56 and 58 are attached at opposite longitudinal ends of the first bottom plate 50 and the first side plates 52 and 54. The channel section 60 is attached to a lateral center of the first bottom plate 50. In the illustrated embodiment, each of the first bottom plate 50, the pair of first lateral side plates 52 and 54, the pair of first end plates 56 and 58 and the channel section 60 are constructed as of metal sheet/plate material. In the illustrated embodiment, the bottom plate 50 and the pair of lateral side plates 52 and 54 are integrally formed as a one-piece, unitary member. On the other hand, in the illustrated embodiment, the end plates 56 and 58 are formed as separate members that are attached to the longitudinal ends of the bottom plate 50 and the pair of lateral side plates 52 and 54.

The channel section 60 includes a planar part 62 attached to the first bottom plate 50 and laterally spaced apart flange parts 64 and 66 extending upwardly from the planar part 62 to form a trough therebetween. The trough and the inlet channel part 21 are sized and shaped so that the inlet channel part 21 is received in the trough between the flange parts 64 and 66, and so that a rectangular cross-sectional shape is formed by the inlet channel part 21 and the first bottom plate 50. The inlet channel part 21 is preferably fixedly attached to the planar part 62. In the illustrated embodiment, each of the flange parts 64 and 66 is discontinuous so as to include a plurality if flange tabs extending upwardly from the planar part 62. The flange tabs at the end of the first tray part 22 where the refrigerant inlet 11a is disposed are longer in the illustrated embodiment because no refrigerant flows out of the inlet channel part 21 at this location. However, the other flange tabs are relatively small so as to be useful in positioning the inlet channel part 21 during assembly, without significant impeding refrigerant flow out of the inlet channel part 21 after assembly.

In the illustrated embodiment, the channel section 60 with the flange parts 64 and 66 is a separate member from the bottom plate 50. However, it will be apparent to those skilled in the art from this disclosure that the flange parts 64 and 66 can be integrally formed with the first bottom plate 50, or can be separate flanges that are fixed to the first bottom plate 50 (e.g., by welding). In the illustrated embodiment, the flange parts 64 and 66 also serve the purpose of indirectly supporting the second canopy part 24. This will be explained in more detail below with respect to the second canopy part 24. In any case, channel section 60 is preferably free of openings in the planar part 62 thereof. The first base plate 50 in a lateral center is also preferably free of openings. Thus, regardless of whether the planar part 62 is provided, liquid refrigerant will have to flow out of the holes 46 of the inlet channel part 21 and into the first tray 22. On the other hand the areas of the first base plate 50 on opposite lateral sides of the flange parts 64 and 66 have holes 68 formed therein to pass liquid refrigerant to the second tray element 23, as explained in more detail below.

Preferably the end plates 56 and 58 are connected to the base plate 50 and the lateral side plates 52 and 54 in a sealed (i.e., air/liquid tight) manner. However, it will be apparent to those skilled in the art from this disclosure that minor leakage from the connection points or seams joining these parts may be permissible as long as liquid and/or gas flow due to leakage does not impact performance. Likewise, the inlet channel part 21 is preferably attached to the channel section 60 and the end plates 56 and 58 in a sealed (i.e., air/liquid tight) manner. However, it will be apparent to those skilled in the art from this disclosure that minor leakage from the connection points or seams joining these parts may be permissible as long as liquid and/or gas flow due to leakage does not impact performance. One suitable technique for making such connections is welding. Thus, refrigerant flowing into the rectangular passage formed by the inlet channel part 21 and the channel section 60 will remain therein except for when exiting from the holes 46 formed in the lateral side plates 42 and 44.

Referring still to FIGS. 5-8, the second canopy part 24 will now be explained in more detail. The second canopy part 24 is an inverted U-shaped member formed of solid sheet/plate material, preferably formed of solid sheet/plate metal. In the illustrated embodiment, the cover is formed of two sections welded together. In other words, a seam (not numbered) is shown in the drawings. However, it will be apparent to those skilled in the art from this disclosure that the second canopy part 24 could be formed of a single section. In the illustrated embodiment, the second canopy part 24 includes a cover top plate 70 and a pair of cover lateral side plates 72 and 74 extending downwardly from the cover top plate 70 to form an inverted U-Shape in transverse cross-section. A width between the pair of cover lateral side plates 72 and 74 is slightly larger than a width between the first lateral side plates 52 and 54 of the first tray 22 so the second canopy part 24 can be mounted on the first tray 22.

In the illustrated embodiment, the pair of cover lateral side plates 72 and 74 are integrally formed with the cover top plate 70 (e.g., and bent downwardly). The second canopy part 24 is attached to the first tray 22 to enclose the top thereof. Specifically, the cover top plate 70 is attached to the first end plate 58. In addition, the pair of cover lateral side plates 72 and 74 are attached to the first lateral side plates 52 and 54, respectively. Finally, the pair of cover lateral side plates 72 and 74 are attached to the first end plate 58. More specifically, because the width between the pair of cover lateral side plates 72 and 74 is slightly larger than a width between the first lateral side plates 52 and 54 of the first tray 22, the cover lateral side plates 72 and 74 are attached in positions laterally outside of the first lateral side plates 52 and 54.

The connections between these parts, like other connections discussed above are preferably sealed (i.e., air/liquid tight) connections. However, it will be apparent to those skilled in the art from this disclosure that minor leakage from the connection points or seams joining these parts may be permissible as long as liquid and/or gas flow due to leakage does not impact performance. One example of a suitable connection is welding.

In the illustrated embodiment, a plurality of support bridges 25 are disposed in a longitudinally spaced arrangement along the refrigerant distributor 20. Each of the support bridges 25 has an inverted U-shape. In the illustrated embodiment, each of the support bridges 25 is constructed of three pieces of rigid sheet/plate material such as rigid sheet metal. However, it will be apparent to those skilled in the art from this disclosure that each bridge support could be constructed of a single piece of material and/or could be constructed of a different material. In the illustrated embodiment, the support bridges 25 have their free ends attached to the small flange tabs of the flange parts 64 and 66. The support bridges 25 are sized to position the second canopy part 24 at the desired vertical position before connecting the second canopy part 24 to the first tray. Specifically, before connecting the second canopy part 24 to the first tray 22, the cover is positioned to rest on the support bridges 25. The second canopy part 24 can be loved longitudinally so that an end is aligned with the first end plate 58 of the first tray 22. Then the second canopy part 24 is attached to the first tray as explained above. The cover may include notches 76, which can be used to check that the second canopy part 24 is fully seated on the support bridges 25 and the first tray 22. More specifically, before attaching the second canopy part 24 an individual may look horizontally at the notches 76 and make sure upper edges of the first lateral side plates 52 and 54 are above the upper ends of the notches 76 to thereby make sure refrigerant will not flow out of the notches 76.

In the illustrated embodiment, the second canopy part 24 preferably has a longitudinal length as long as or longer than the second inverted U-shaped section of the inlet channel part 21 having the holes 46. In addition, the second canopy part 24 preferably has a lateral width slightly wider than a lateral width of the first tray 22, and a height at least as tall as the lateral side walls of the first tray 22. When the second canopy part 24 is attached to the first tray 22, a rectangular enclosed chamber is formed that extends from the first end plate 56 to a free end of the second canopy part 24. The area of the distributor 20 extending from the free end of the second canopy part 24 to the first end plate 56 that is above the first tray 22 and the inlet channel part 21 adjacent the refrigerant inlet 11*a* forms a refrigerant vapor distribution outlet O.

As best shown in FIGS. 4-5, the second tray element 23 will now be explained in more detail. The second try part 23 includes three identical tray sections 23*a* that are aligned side-by-side along the longitudinal center axis C of the shell 10. As shown in FIG. 5, an overall longitudinal length of the three second tray parts 23*a* is substantially the same as a longitudinal length of the first tray part 22 as shown in FIG. 5. A transverse width of the second tray element 23 is set to be larger than a transverse width of the first tray part 22 so that the second tray element 23 extends over substantially an entire width of the tube bundle 30 as shown in FIG. 7. The second tray element 23 is arranged so that the liquid refrigerant accumulated in the second tray element 23 does not communicate between the second tray sections 23*s*. As shown in FIGS. 5-6, each of the second tray parts 23*a* has a plurality of second discharge apertures 23*b* from which the liquid refrigerant is discharged downwardly toward the tube bundle 30. Specifically, the second tray element 23 preferably has a larger number of apertures 23*b* than the holes 68 of the first tray part 22. Thus, the refrigerant distributor 20 has at least one liquid refrigerant distribution opening 23*b* that distributes liquid refrigerant. The second tray element 23 is preferably supported by the heat transferring unit 30, as explained below.

Referring again to FIGS. 4-9, the heat transferring unit 30 (tube bundle) will now be explained in more detail. The tube bundle 30 is disposed below the refrigerant distributor 20 so that the liquid refrigerant discharged from the refrigerant distributor 20 is supplied onto the tube bundle 30. The tube bundle 30 includes a plurality of heat transfer tubes 31 that extend generally parallel to the longitudinal center axis C of the shell 10 as shown in FIG. 6. The heat transfer tubes 31 are made of materials having high thermal conductivity, such as metal. The heat transfer tubes 31 are preferably provided with interior and exterior grooves to further promote heat exchange between the refrigerant and the water flowing inside the heat transfer tubes 31. Such heat transfer tubes including the interior and exterior grooves are well known in the art. For example, GEWA-B tubes by Wieland Copper Products, LLC may be used as the heat transfer tubes 31 of this embodiment. As best understood from FIGS. 6-7, the heat transfer tubes 31 are supported by a plurality of vertically extending support plates 32, which are fixedly coupled to the shell 10. The support plates 32 also support the second tray, which is fixedly attached to the support plates 32.

In this embodiment, the tube bundle 30 is arranged to form a two-pass system, in which the heat transfer tubes 31 are divided into a supply line group disposed in a lower portion of the tube bundle 30, and a return line group disposed in an upper portion of the tube bundle 30. As shown in FIG. 6, inlet ends of the heat transfer tubes 31 in the supply line group are fluidly connected to the water inlet pipe 15 via the inlet water chamber 13a of the connection head member 13 so that water entering the evaporator 1 is distributed into the heat transfer tubes 31 in the supply line group. Outlet ends of the heat transfer tubes 31 in the supply line group and inlet ends of the heat transfer tubes 31 of the return line tubes are fluidly communicated with a water chamber 14a of the return head member 14. Therefore, the water flowing inside the heat transfer tubes 31 in the supply line group is discharged into the water chamber 14a, and redistributed into the heat transfer tubes 31 in the return line group. Outlet ends of the heat transfer tubes 31 in the return line group are fluidly communicated with the water outlet pipe 16 via the outlet water chamber 13b of the connection head member 13. Thus, the water flowing inside the heat transfer tubes 31 in the return line group exits the evaporator 1 through the water outlet pipe 16. In a typical two-pass evaporator, the temperature of the water entering at the water inlet pipe 15 may be about 54 degrees F. (about 12° C.), and the water is cooled to about 44 degrees F. (about 7° C.) when it exits from the water outlet pipe 16. Although, in this embodiment, the evaporator 1 is arranged to form a two-pass system in which the water goes in and out on the same side of the evaporator 1, it will be apparent to those skilled in the art from this disclosure that the other conventional system such as a one-pass or three-pass system may be used. Moreover, in the two-pass system, the return line group may be disposed below or side-by-side with the supply line group instead of the arrangement illustrated herein.

More detailed arrangement for a heat transfer mechanism of the evaporator 1 according to the illustrated embodiment will be explained with reference to FIG. 7. As described above, the refrigerant in a two-phase state or at least including liquid refrigerant is supplied through the refrigerant inlet 11a to the inlet channel part 21 of the refrigerant distributor 20 via the inlet pipe 11b. In FIG. 7, the flow of refrigerant in the refrigeration circuit is schematically illustrated, and the inlet pipe 11b is omitted for the sake of brevity. The vapor component of the refrigerant supplied to the refrigerant distributor 20 is separated from the liquid component in the first tray part 22. The liquid component of the two-phase refrigerant is accumulated in the first tray part 22 and then in the second tray parts 23a, and discharged from the discharge apertures 23b of the second tray element 23 downwardly towards the tube bundle 30. As best understood from FIG. 6 refrigerant vapor (gas) cannot flow directly from the first tray 22 to the shell refrigerant vapor outlet 12a. Rather, the gas (or vapor) refrigerant must flow back towards the refrigerant inlet 11a (to the left), through the refrigerant vapor distribution outlet O, and then flow toward the shell refrigerant vapor outlet 12a. This flow can reduce the prevalence of liquid refrigerant droplets within the refrigerant gas discharged from the refrigerant vapor distribution outlet O from being carried over back to the compressor 2.

As shown in FIG. 7, the tube bundle 30 of the illustrated embodiment is hybrid tube bundle including a falling film region and a flooded region. The heat transfer tubes 31 in the falling film region are configured and arranged to perform falling film evaporation of the liquid refrigerant. More specifically, the heat transfer tubes 31 in the falling film region are arranged such that the liquid refrigerant discharged from the refrigerant distributor 20 forms a layer (or a film) along an exterior wall of each of the heat transfer tubes 31, where the liquid refrigerant evaporates as vapor refrigerant while it absorbs heat from the water flowing inside the heat transfer tubes 31. As shown in FIG. 7, the heat transfer tubes 31 in the falling film region are arranged in a plurality of vertical columns extending parallel to each other when seen in a direction parallel to the longitudinal center axis C of the shell 10 (as shown in FIG. 7). Therefore, the refrigerant falls downwardly from one heat transfer tube to another by force of gravity in each of the columns of the heat transfer tubes 31. The columns of the heat transfer tubes 31 are disposed with respect to the second discharge openings 23b of the second tray element 23 so that the liquid refrigerant discharged from the second discharge openings 23b is deposited onto an uppermost one of the heat transfer tubes 31 in each of the columns.

The liquid refrigerant that did not evaporate in the falling film region continues falling downwardly by force of gravity into the flooded region. The flooded region includes the plurality of the heat transfer tubes 31 disposed in a group below the falling film region at the bottom portion of the hub shell 11. For example, the bottom, 1, 2 or three rows of tubes 31 can be disposed as part of the flooded region depending on the amount of refrigerant charged in the system. While a hybrid tube bundle is disclosed in the illustrated embodiment, it will be apparent to those skilled in the art from this disclosure that other tube bundle designs can be used together with the distributor 20 in the evaporator 1 of the present invention.

In this embodiment, a fluid conduit 8 is fluidly connected to the flooded region within the shell 10. Specifically, the shell 10 includes a bottom outlet pipe 17 in fluid communication with the conduit 8. A pump device (not shown) may be connected to the fluid conduit 8 to return the fluid from the bottom of the shell 10 to the compressor 2 or may be branched to the inlet pipe 11b to be supplied back to the refrigerant distributor 20. The pump can be selectively operated when the liquid accumulated in the flooded region reaches a prescribed level to discharge the liquid therefrom to outside of the evaporator 1. In the illustrated embodiment, the fluid conduit 8 is connected to a bottom most point of the flooded region. However, it will be apparent to those skilled in the art from this disclosure that instead of the fluid conduit 8, a fluid conduit 8' can be coupled to the flooded region at a location spaced from the bottom most point of the flooded region. In any case, the fluid conduit 8 or 8' is preferably fluidly connected to the flooded region at a location between the bottom most point of the flooded region and a location corresponding to the level of liquid in the flooded region (e.g., between the bottom most point and the top tier of tubes 31 in the flooded region). Moreover, it will be apparent to those skilled in the art from this disclosure that the pump device (not shown) could instead be an ejector (not shown).

In the case, where the pump device is replaced with an ejector, the ejector also receives compressed refrigerant from the compressor 2. The ejector can then mix the compressed refrigerant from the compressor 2 with the liquid received from the flooded region so that a particular oil concentration can be supplied back to the compressor 2. Pumps and ejectors such as those mentioned above are well known in the art and thus, will not be explained or illustrated in further detail herein.

Referring still to FIGS. 4-9, operation of the refrigerant distributor 20 as a whole and cooperation between the parts of the evaporator 1 will now be explained in more detail. As mentioned above, the refrigerant vapor distribution outlet opening O is formed longitudinally between the free end of the second canopy part 24 and the first end plate 56, and laterally between the first lateral side plates 52 and 54, as best understood from FIG. 5. The refrigerant vapor distribution outlet opening O is longitudinally spaced from the shell refrigerant vapor outlet 12a. In addition the shell refrigerant vapor outlet 12a is separate from the refrigerant vapor distribution outlet opening O of distributor 20 so that refrigerant vapor exiting the refrigerant vapor distribution outlet opening O flows into an interior of the shell 10 before flowing out of the shell refrigerant vapor outlet 12a. The refrigerant vapor distribution outlet opening O has a longitudinal length $L_1$ less than one half of an overall longitudinal length $L_2$ of the refrigerant distributor 20. In the illustrated embodiment, the longitudinal length $L_1$ of the refrigerant vapor distribution outlet opening O is less than one fourth of an overall longitudinal length $L_2$ of the refrigerant distributor 20 (e.g. 15-20%).

In additional to the longitudinal size of the refrigerant vapor distribution outlet opening O, a longitudinal space S between the refrigerant vapor distribution outlet opening O and the shell refrigerant vapor outlet 12a is at least 25% of the overall longitudinal length $L_2$ of the refrigerant distributor 20. In the illustrated embodiment, longitudinal space S between the refrigerant vapor distribution outlet opening O and the shell refrigerant vapor outlet 12a is at least 50% of the overall longitudinal length $L_2$ of the refrigerant distributor 20 (e.g. 55-60%). Furthermore, in the illustrated embodiment, the refrigerant inlet 11a is disposed longitudinally closer to a first longitudinal end of the refrigerant distributor 20 than to a second longitudinal end of the refrigerant distributor 20. Moreover, in the illustrated embodiment, the shell refrigerant vapor outlet 12a is disposed longitudinally closer to the second longitudinal end of the refrigerant distributor 20 than to the first longitudinal end of the refrigerant distributor 20. Therefore, in the illustrated embodiment, the refrigerant vapor distribution outlet opening O is closer to the refrigerant inlet 11a than to the shell refrigerant vapor outlet 12a.

Referring still to FIGS. 4-9, the refrigerant distributor 20 extends longitudinally within the shell 10 as mentioned above. In addition, the refrigerant distributor 20 includes a first inner distributor casing formed by the inlet channel part 21 and either the planar part 62 of the channel section 60 or the base plate 50 (e.g., the parts forming the tubular cross-section together with the inlet channel part 21. The refrigerant distributor 20 also includes a second outer distributor casing formed by parts of the first tray part 22 and the second canopy member 24. More specifically, in the illustrated embodiment, the base plate 50, the lateral side plates 52 and 54, the end plates 56 and 58, the cover top plate 70 and the cover lateral side plates 72 and 74, which together form an outer tubular cross-section of the distributor that is terminated by the end plates 56 and 58. A best understood from FIGS. 5 and 7, the first inner distributor casing is disposed within the second outer distributor casing, the first inner distributor casing is connected to the refrigerant inlet 11a, and the first inner distributor casing distributes refrigerant into an interior space of the second outer distributor casing along a longitudinal length of the second outer distributor casing where the holes 46 are formed.

The second outer distributor casing has the liquid refrigerant distribution openings 68 that distribute liquid refrigerant and the refrigerant vapor distribution outlet opening O. Of course, it will be apparent to those skilled in the art from this disclosure that the plurality of openings 68 could be replaced by fewer openings, even a single opening. In any case, the second outer distributor includes at least one liquid refrigerant distribution opening 68. The first inner distributor casing has the plurality of distribution openings 46. However, it will be apparent to those skilled in the art from this disclosure that the plurality of openings 46 could be replaced by fewer openings, even a single opening. In any case, the first inner distributor casing has at least one first inner distribution opening 46 formed in at least one of a bottom part (e.g. planar part 62), a pair of side parts (42 and/or 44) and a top part (40) of the first inner distributor casing. In the illustrated embodiment, a plurality of first inner distribution openings 46 are formed in each of the side plates 42 and 44. Thus, the at least one first inner distribution opening 46 is formed in the pair of side parts 42 and 44 of the first inner distributor casing.

As explained above, the second outer distributor casing includes the first tray part 22 extending longitudinally below and/or along a bottom of the first inner distributor casing, and the second canopy part 24 extending longitudinally above the first inner distributor casing. As also explained above, the first tray part 22 and the second canopy part 24 are connected to each other on lateral sides of the refrigerant distributor 20, and the second canopy part 24 has a longitudinal length shorter than a longitudinal length of the first tray part 22 to form the refrigerant vapor distribution outlet opening O. As mentioned above, the first tray part 22 has the at least one liquid refrigerant distribution opening 68 formed therein. In the illustrated embodiment, the first tray part 22 includes a plurality of liquid refrigerant distribution opening 68, all disposed at a location below a vertical location of the refrigerant vapor distribution outlet opening O. As mentioned above, the inlet channel part 21 has an inverted U-shape. Thus, an inverted U shaped channel (e.g., the inlet channel part 21) is attached longitudinally to the first tray part 22 to form the first inner distributor casing, and the inverted U shaped channel has at least one first inner distribution opening 46 formed therein.

The arrangements for the refrigerant distributor 20 are not limited to the ones illustrated in FIG. 7. Rather, it will be apparent to those skilled in the art from this disclosure that various changes and modifications can be made herein without departing from the scope of the invention. Several modified examples will be explained below.

Second Embodiment

Referring now to FIGS. 10-14, an evaporator 201 having a refrigerant distributor 220 in accordance with a second embodiment will now be explained in more detail. The evaporator 201 is identical to the evaporator 1 of the first embodiment, except for the inclusion of the modified refrigerant distributor 220. Therefore it will be apparent to those skilled in the art from this disclosure that the descriptions and illustrations of the first embodiment also apply to this second embodiment, except as explained and illustrated herein. Moreover, parts of this second embodiment that are identical to parts of the first embodiment will use the same reference numbers and/or reference numerals will not be included in the description of this second embodiment. However, it will be apparent to those skilled in the art from this disclosure that only modified and/or new parts of this second embodiment need to be given reference numerals, and that reference numerals of the first embodiment will only be included to the extent necessary to understand the second embodiment.

The refrigerant distributor 220 of this second embodiment includes all the parts of the first embodiment, but further includes an additional part, a shroud plate 226 at least partially overlying the refrigerant vapor distribution outlet opening O. In particular, the shroud plate 226 overlies the top of the refrigerant vapor distribution outlet opening O. The shroud plate 226 has a shroud top plate 280 and a pair of side shroud plates 282 and 284 extending downwardly from the top shroud plate to form a substantially inverted U shaped configuration. In addition, the shroud plate preferably includes end plates 286 and 288, each including a section on an opposite lateral side of the shroud top plate 280. Each shroud side plate 282 and 284 includes an inclined section 282a and 284a extending from the shroud top plate 280, and a vertical section 282b and 284b extending downwardly from the inclined section 292a and 282b, respectively. Due to this configuration of the shroud plate 226, refrigerant vapor will not flow vertically up out of the refrigerant vapor distribution outlet opening O, but will have to flow laterally sideways and downwardly out of the refrigerant vapor distribution outlet opening O before flowing to the shell vapor outlet 12a.

The elements of the shroud plate 226 are preferably constructed of rigid sheet/plate material such as sheet metal. The shroud top plate 280 and the pair of side shroud plates 282 and 284 can be constructed as a single member that is bent into the shape illustrated herein. However, in the illustrated embodiment, the end plates 286 and 288 are preferably constructed as separate members that are attached to the shroud top plate 280 and the pair of side shroud plates 282 and 284 using any suitable conventional technique such as welding. In addition, the shroud plate 226 in the illustrated embodiment is welded to the parts of the distributor 20 of the first embodiment along the intersections (e.g., seams) in an air/liquid tight arrangement. The shroud plate 226 may assist limiting liquid carryover to the shell vapor refrigerant outlet 12a.

Third Embodiment

Figure 15:
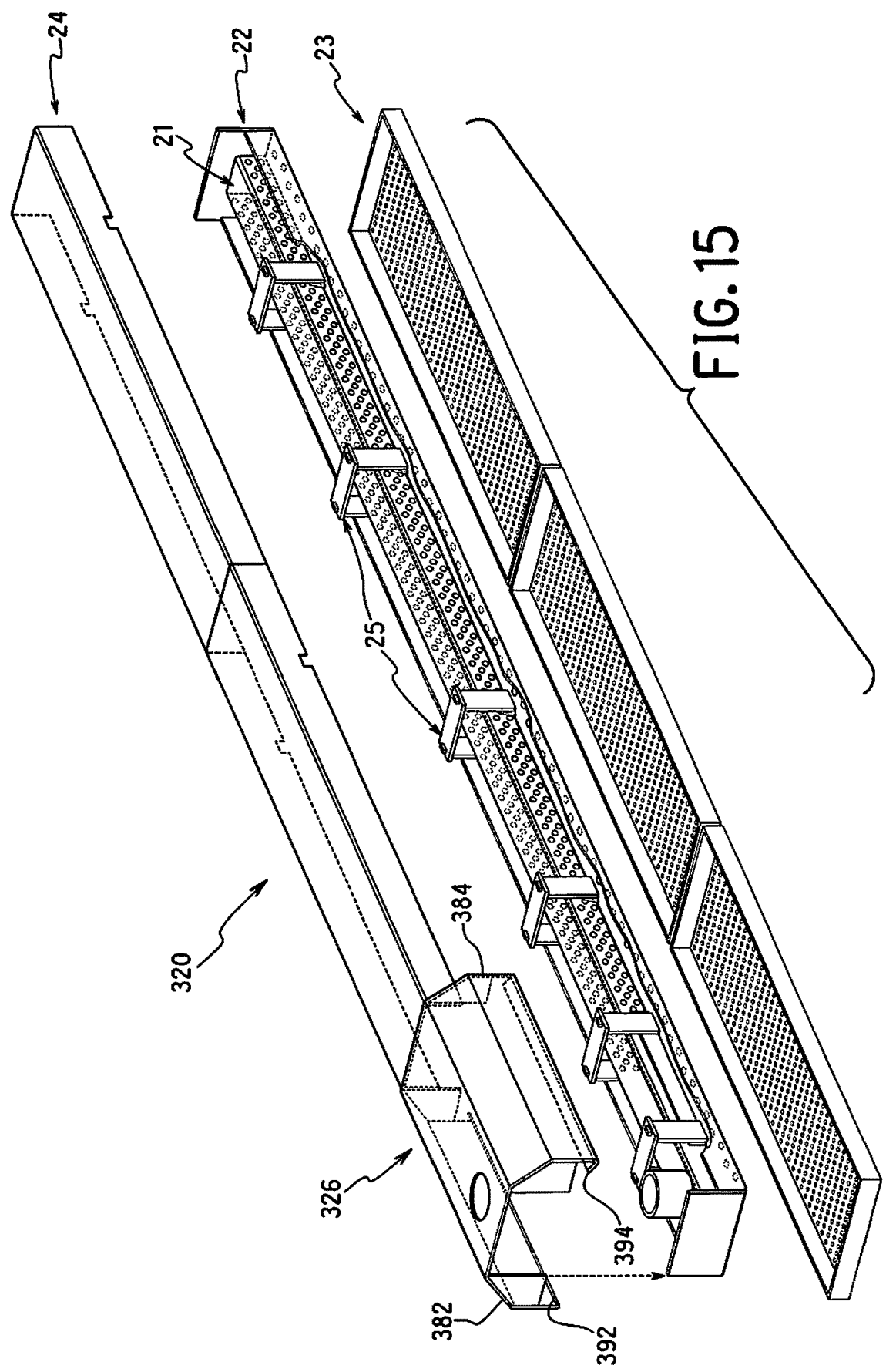
FIG. 15 is a simplified partially exploded perspective view of an internal structure of a refrigerant distributor of a heat exchanger in accordance with a third embodiment of the present invention.

Referring now to FIG. 15, a refrigerant distributor 320 in accordance with a third embodiment will now be explained in more detail. The refrigerant distributor 320 is designed to be used in place of either the distributor 20 or the distributor 220 of the preceding embodiments to form an evaporator in accordance with this third embodiment. However, for the sake of brevity, all the parts of the evaporator will not be explained and illustrated again since this would be redundant. Rather, it will be apparent to those skilled in the art from this disclosure that the descriptions and illustrations of the second embodiment also apply to this third embodiment, except as explained and illustrated herein.

The refrigerant distributor 320 of this third embodiment is identical to the refrigerant distributor 220 of the second embodiment, except the distributor 320 includes a modified shroud 326 having modified side shroud plates 382 and 384, which include tabs 392 and 394 extending upwardly from a lower end thereof to form a V-channel at a bottom end thereof, respectively. Otherwise, the shroud plate 326 is identical to the shroud plate 226. Therefore it will be apparent to those skilled in the art from this disclosure that the descriptions and illustrations of the first and second embodiments also apply to this third embodiment, except as explained and illustrated herein. Moreover, parts of this third embodiment that are identical to parts of the first and/or second embodiments will use the same reference numbers and/or reference numerals will not be included. However, it will be apparent to those skilled in the art from this disclosure that only modified and/or new parts of this third embodiment need to be given reference numerals, and that reference numerals of the first and second embodiments will only be included to the extent necessary to understand the third embodiment.

Fourth Embodiment

Figure 16:
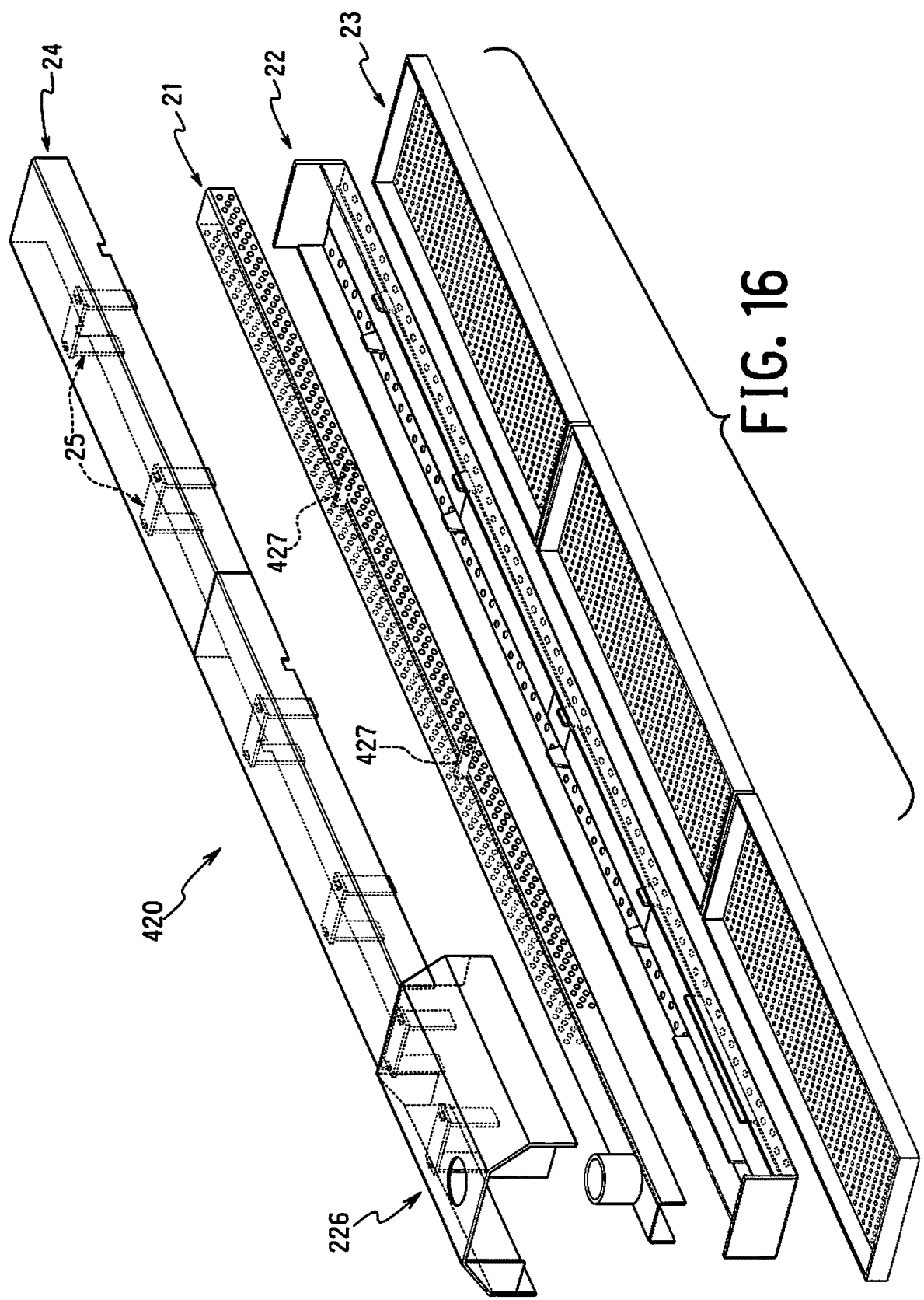
FIG. 16 is a simplified partially exploded perspective view of an internal structure of a refrigerant distributor of a heat exchanger in accordance with a fourth embodiment of the present invention.

Referring now to FIG. 16, a refrigerant distributor 420 in accordance with a fourth embodiment will now be explained in more detail. The refrigerant distributor 420 is designed to be used in place of either the distributor 20 or the distributor 220 of the preceding embodiments to form an evaporator in accordance with this fourth embodiment. However, for the sake of brevity, all the parts of the evaporator will not be explained and illustrated again since this would be redundant. Rather, it will be apparent to those skilled in the art from this disclosure that the descriptions and illustrations of the second embodiment also apply to this fourth embodiment, except as explained and illustrated herein.

Therefore it will be apparent to those skilled in the art from this disclosure that the descriptions and illustrations of the first and second embodiments also apply to this fourth embodiment, except as explained and illustrated herein. Moreover, parts of this fourth embodiment that are identical to parts of the first and/or second embodiments will use the same reference numbers and/or reference numerals will not be included. However, it will be apparent to those skilled in the art from this disclosure that only modified and/or new parts of this fourth embodiment need to be given reference numerals, and that reference numerals of the first and second embodiments will only be included to the extent necessary to understand the fourth embodiment. In addition, the modification of this fourth embodiment may be applied to the third embodiment.

The refrigerant distributor 420 of this fourth embodiment is identical to the refrigerant distributor 220 of the second embodiment, except the distributor 420 includes at least one transverse baffle plate 427 disposed therein. In particular, in the illustrated embodiment, a plurality of transverse baffle plates 427 (e.g., two) are disposed in a longitudinally spaced arrangement within the inlet channel part 21. Thus, the first inner distributor casing has at least one transverse baffle plate 427 disposed therein. The baffle plate or plates 427 have heights lower than the height of the inside of the inlet channel part 21. Thus, the baffle plates 427 can impede the flow of refrigerant therein but still allow flow.

Fifth Embodiment

Figure 17:
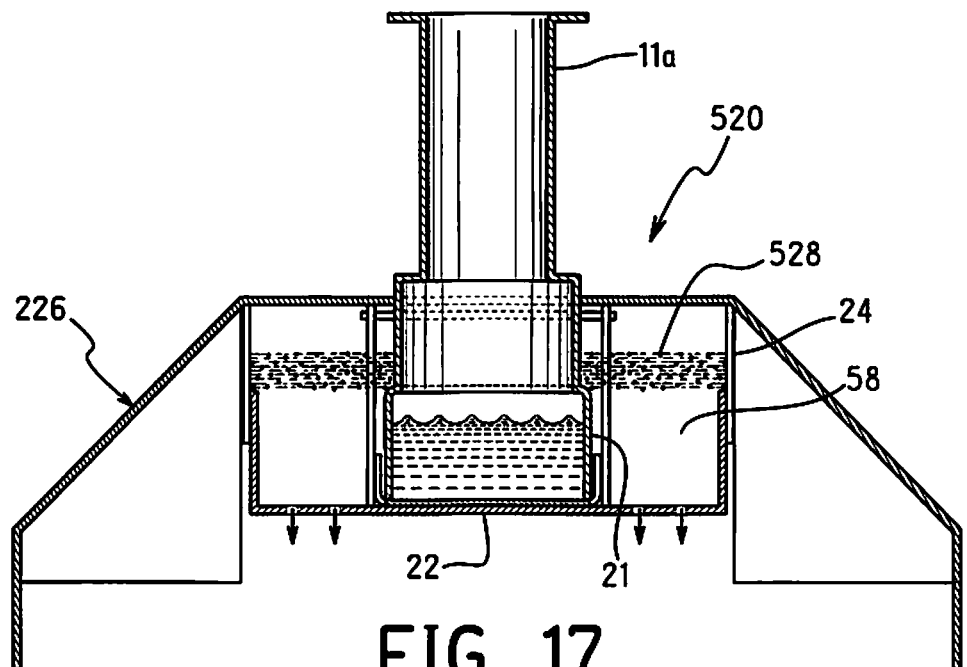
FIG. 17 is an enlarged partial transverse cross-sectional view of a distributor of a heat exchanger in accordance with a fifth embodiment of the present invention.

Referring now to FIG. 17, a refrigerant distributor 520 in accordance with a fifth embodiment will now be explained in more detail. The refrigerant distributor 520 is designed to be used in place of either the distributor 20 or the distributor 220 of the preceding embodiments to form an evaporator in accordance with this fifth embodiment. However, for the sake of brevity, all the parts of the evaporator will not be explained and illustrated again since this would be redundant. Rather, it will be apparent to those skilled in the art from this disclosure that the descriptions and illustrations of the second embodiment also apply to this fifth embodiment, except as explained and illustrated herein.

Therefore it will be apparent to those skilled in the art from this disclosure that the descriptions and illustrations of the first and second embodiments also apply to this fifth embodiment, except as explained and illustrated herein. Moreover, parts of this fifth embodiment that are identical to parts of the first and/or second embodiments will use the same reference numbers and/or reference numerals will not be included. However, it will be apparent to those skilled in the art from this disclosure that only modified and/or new parts of this fifth embodiment need to be given reference numerals, and that reference numerals of the first and second embodiments will only be included to the extent necessary to understand the fifth embodiment. In addition, the modification of this fifth embodiment may be applied to the third embodiment and/or the fourth embodiment.

The refrigerant distributor 520 of this fifth embodiment is identical to the refrigerant distributor 220 of the second embodiment, except the distributor 520 includes a demister 528 disposed outside of the first inner distributor and disposed inside the second outer distributor casing. Specifically, the demister 528 is disposed so that a bottom thereof is disposed in substantial alignment with the top of the inlet channel part 21, and the demister 528 does not extend to the top plate 50 of the inlet channel part 21. Thus, the demister 528 is disposed in a liquid vapor interface region and not necessarily in the all vapor region. In the illustrated embodiment, the demister 528 includes a mesh plate material. The material of such a demister is well known in the art, and thus will not be explained in more detail. The demister 528 preferably extends longitudinally continuously from the refrigerant inlet Ha to the end plate 58, and laterally continuously from side to side as shown in FIG. 17.

Sixth Embodiment

Figure 18:
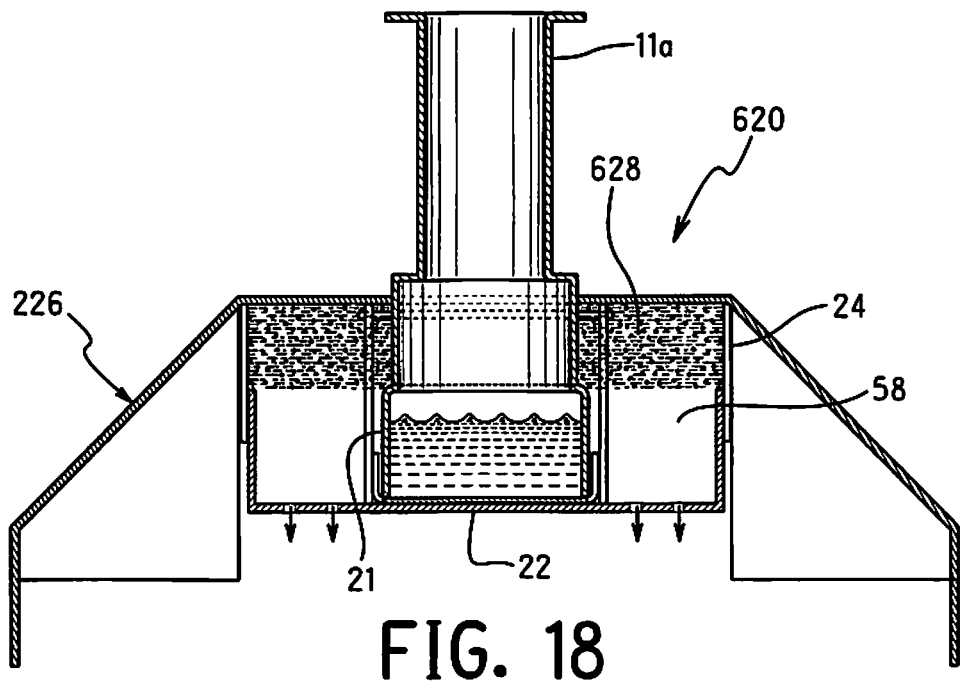
FIG. 18 is an enlarged partial transverse cross-sectional view of a distributor of a heat exchanger in accordance with a sixth embodiment of the present invention.

Referring now to FIG. 18, a refrigerant distributor 620 in accordance with a sixth embodiment will now be explained in more detail. The refrigerant distributor 620 is designed to be used in place of either the distributor 20 or the distributor 220 of the preceding embodiments to form an evaporator in accordance with this sixth embodiment. However, for the sake of brevity, all the parts of the evaporator will not be explained and illustrated again since this would be redundant. Rather, it will be apparent to those skilled in the art from this disclosure that the descriptions and illustrations of the second embodiment also apply to this sixth embodiment, except as explained and illustrated herein.

Therefore it will be apparent to those skilled in the art from this disclosure that the descriptions and illustrations of the first and second embodiments also apply to this sixth embodiment, except as explained and illustrated herein. Moreover, parts of this sixth embodiment that are identical to parts of the first and/or second embodiments will use the same reference numbers and/or reference numerals will not be included. However, it will be apparent to those skilled in the art from this disclosure that only modified and/or new parts of this sixth embodiment need to be given reference numerals, and that reference numerals of the first and second embodiments will only be included to the extent necessary to understand the sixth embodiment. In addition, the modification of this sixth embodiment may be applied to the third embodiment and/or the fourth embodiment.

The refrigerant distributor 620 of this sixth embodiment is identical to the refrigerant distributor 220 of the second embodiment, except the distributor 620 includes a demister 628 disposed outside of the first inner distributor and disposed inside the second outer distributor casing. Specifically, the demister 628 is disposed so that a bottom thereof is disposed in substantial alignment with the top of the inlet channel part 21, and the demister 628 extends to the top plate 50 of the inlet channel part 21. Thus, the demister 628 is disposed in a liquid vapor interface region and the all vapor region. In the illustrated embodiment, the demister 628 includes a mesh plate material. The material of such a demister is well known in the art, and thus will not be explained in more detail. The demister 628 preferably extends longitudinally continuously from the refrigerant inlet Ha to the end plate 58, and laterally continuously from side to side as shown in FIG. 18.

Seventh Embodiment

Figure 19:
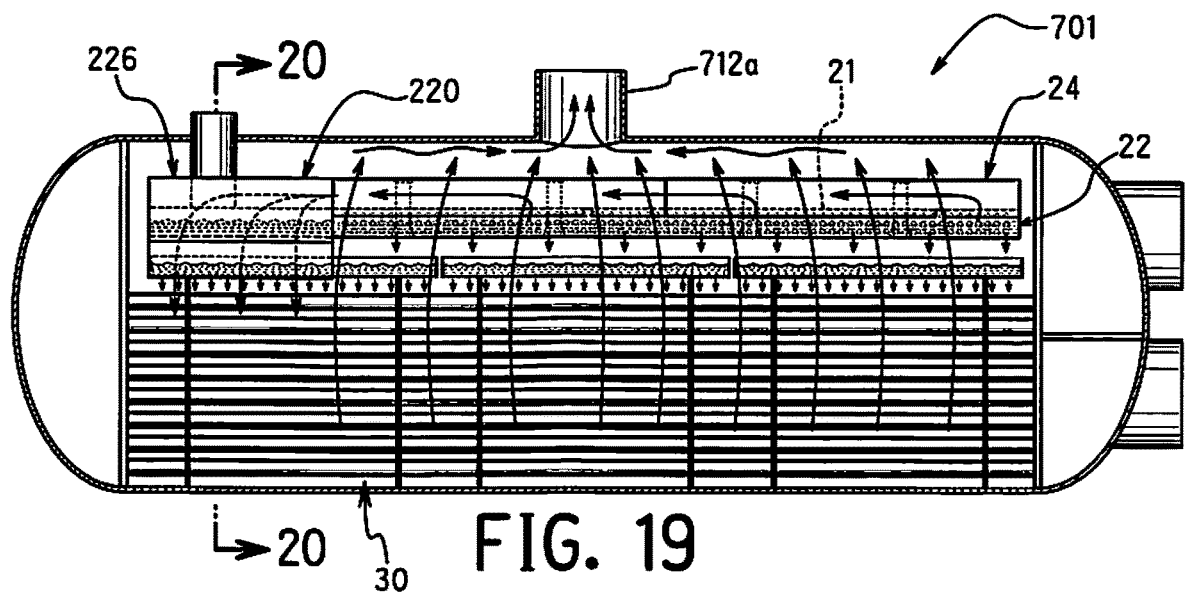
FIG. 19 is a simplified longitudinal cross sectional view of a heat exchanger and distributor in accordance with a seventh embodiment of the present invention, as taken along a section line like 6-6 in FIG. 3.
Figure 20:
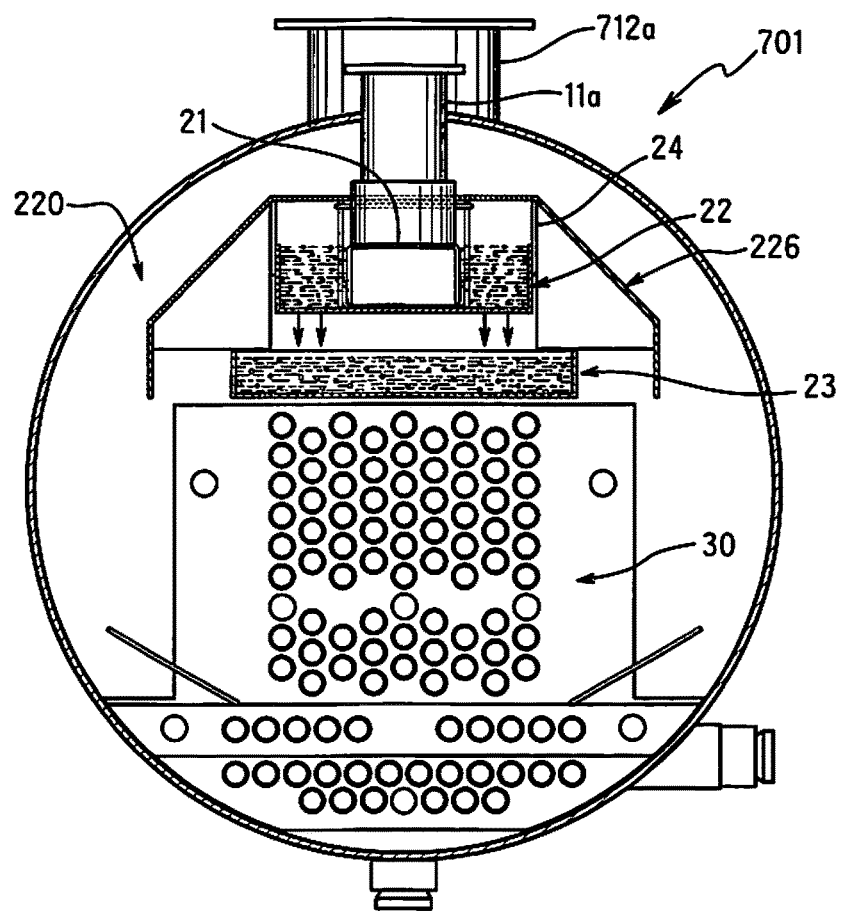
FIG. 20 is a simplified transverse cross sectional view of the heat exchanger and distributor illustrated in FIG. 19, as taken along a section line like 20-20 in FIG. 19.

Referring now to FIGS. 19-20, an evaporator 701 in accordance with a seventh embodiment will now be explained in more detail. The evaporator 701 is identical to the evaporator 201 of the second embodiment, except for the inclusion of a modified shell refrigerant vapor outlet 712a that is longitudinally centrally disposed. Therefore it will be apparent to those skilled in the art from this disclosure that the descriptions and illustrations of the first and second embodiments also apply to this seventh embodiment, except as explained and illustrated herein. Moreover, parts of this seventh embodiment that are identical to parts of the first and/or second embodiments will use the same reference numbers and/or reference numerals will not be included. However, it will be apparent to those skilled in the art from this disclosure that only modified and/or new parts of this seventh embodiment need to be given reference numerals, and that reference numerals of the first and second embodiments will only be included to the extent necessary to understand the seventh embodiment. In addition, this modification of the seventh embodiment may be applied to the third, fourth, fifth and/or sixth embodiments.

Because the shell refrigerant vapor outlet 712a is longitudinally centrally disposed, the shell refrigerant vapor outlet 712a is substantially equally longitudinally spaced from the first and second longitudinal ends of the refrigerant distributor. In addition, due to this modified location of the shell refrigerant vapor outlet 712a the space between the refrigerant vapor distribution outlet opening O and the shell refrigerant vapor outlet 712a is smaller. However, the longitudinal space between the refrigerant vapor distribution outlet opening O and the shell refrigerant vapor outlet 12a is still preferably at least 25% of an overall longitudinal length of the refrigerant distributor 20, even though FIG. 19 may not be to scale.

Eighth Embodiment

Figure 21:
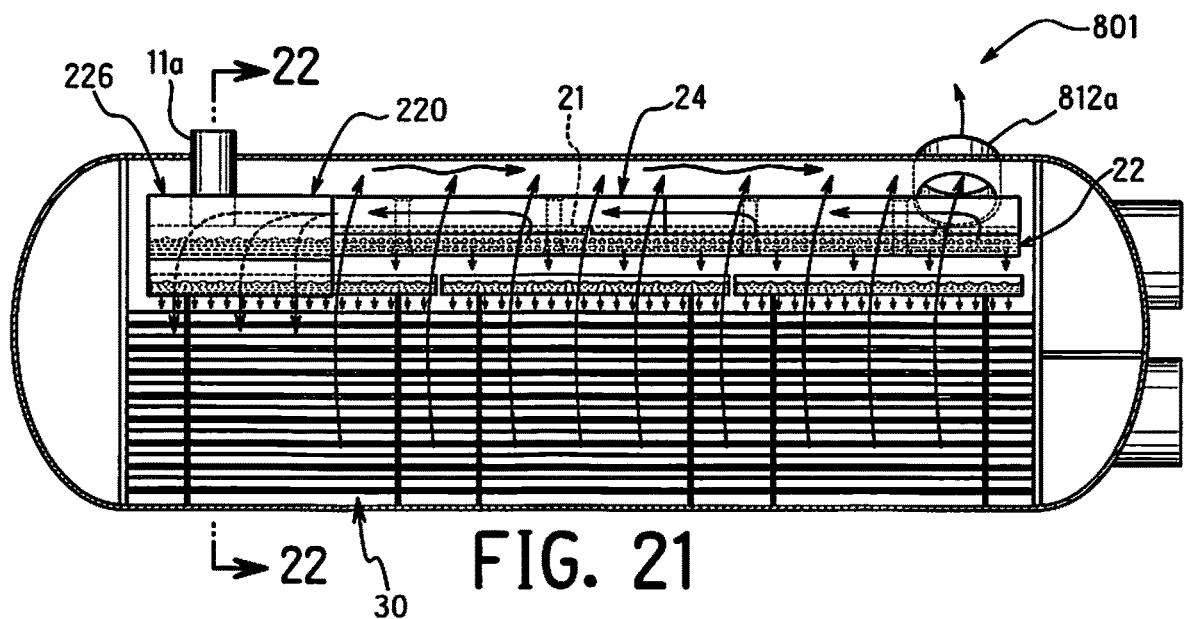
FIG. 21 is a simplified longitudinal cross sectional view of a heat exchanger and distributor in accordance with a eighth embodiment of the present invention, as taken along a section line like 6-6 in FIG. 3.
Figure 22:
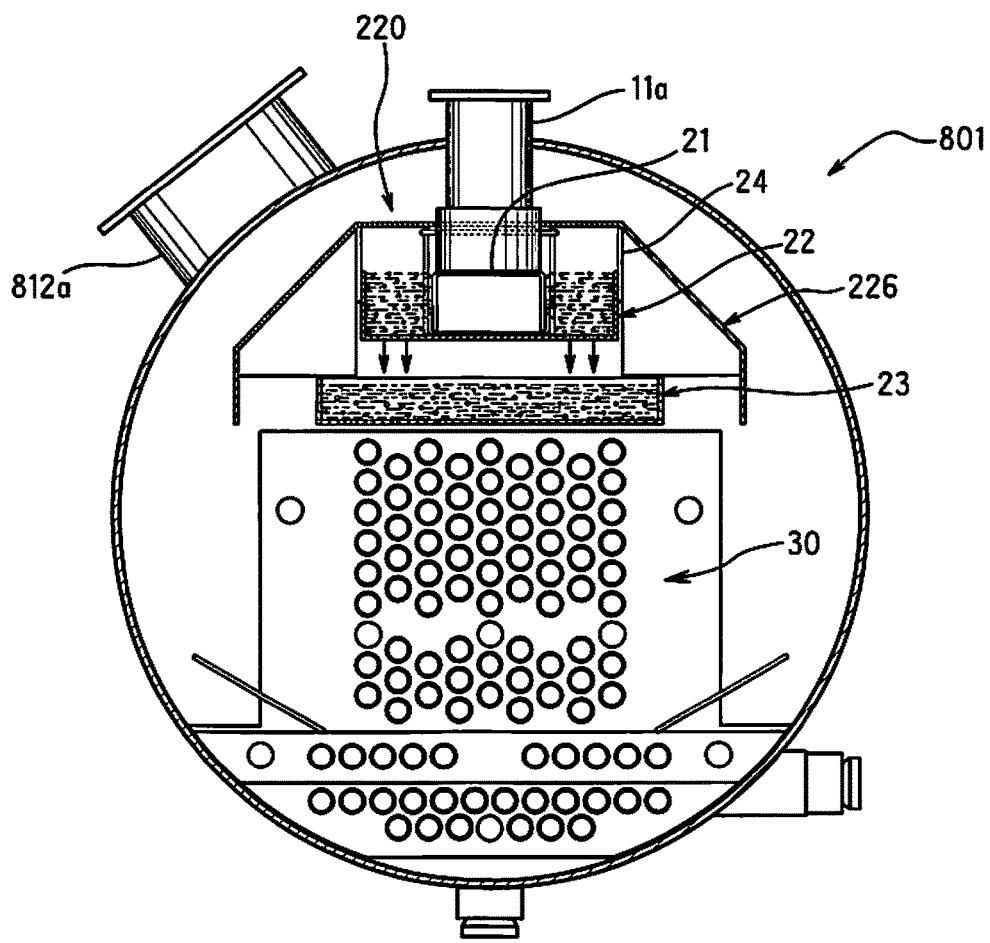
FIG. 22 is a simplified transverse cross sectional view of the heat exchanger and distributor illustrated in FIG. 21, as taken along a section line like 22-22 in FIG. 21.

Referring now to FIGS. 21-22, an evaporator 801 in accordance with a eighth embodiment will now be explained in more detail. The evaporator 801 is identical to the evaporator 1 of the second embodiment, except for the inclusion of a modified shell refrigerant vapor outlet 812a that is inclined relative to the vertical direction and moved laterally to the side. Therefore it will be apparent to those skilled in the art from this disclosure that the descriptions and illustrations of the first and second embodiments also apply to this eighth embodiment, except as explained and illustrated herein. Moreover, parts of this eighth embodiment that are identical to parts of the first and/or second embodiments will use the same reference numbers and/or reference numerals will not be included. However, it will be apparent to those skilled in the art from this disclosure that only modified and/or new parts of this eighth embodiment need to be given reference numerals, and that reference numerals of the first and second embodiments will only be included to the extent necessary to understand the eighth embodiment. In addition, this modification of the eighth embodiment may be applied to the third, fourth, fifth and/or sixth embodiments.

Ninth Embodiment

Figure 23:
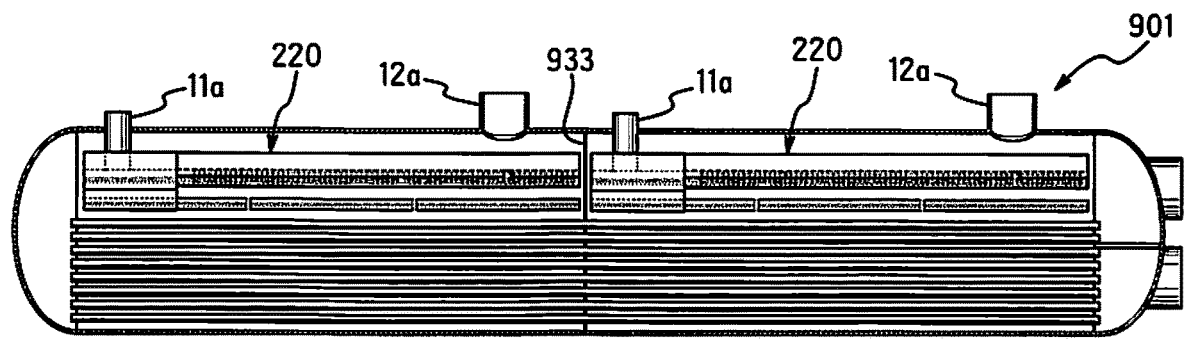
FIG. 23 is a simplified longitudinal cross sectional view of a heat exchanger and distributor in accordance with an ninth embodiment of the present invention, as taken along a section line like 6-6 in FIG. 3.

Referring now to FIG. 23, an evaporator 901 having a pair of refrigerant distributors 220, a pair of refrigerant inlets 11a and a pair of shell vaper refrigerant outlets 12a in accordance with a ninth embodiment will now be explained in more detail. The evaporator 901 is identical to the evaporator 201 of the second embodiment, except the evaporator 901 is a double distributor evaporator with a modified elongated tube bundle 930, a modified elongated shell 910 and a pair of the distributors 220 disposed side by side for the inclusion of the modified refrigerant distributor 220. A divider 933 is disposed between the two halves. Due to the lengthening some parts are not identical but rather are functionally identical. Description of these parts will be omitted for the sake of brevity. However, it will be apparent to those skilled in the art from this disclosure that the descriptions and illustrations of the first and second embodiments also apply to this ninth embodiment. Therefore it will be apparent to those skilled in the art from this disclosure that the descriptions and illustrations of the first and second embodiments also apply to this ninth embodiment, except as explained and illustrated herein. Moreover, parts of this ninth embodiment that are identical to parts of the first and/or second embodiments will use the same reference numbers and/or reference numerals will not be included. However, it will be apparent to those skilled in the art from this disclosure that only modified and/or new parts of this ninth embodiment need to be given reference numerals, and that reference numerals of the first and/or second embodiments will only be included to the extent necessary to understand the ninth embodiment.

Tenth Embodiment

Figure 24:
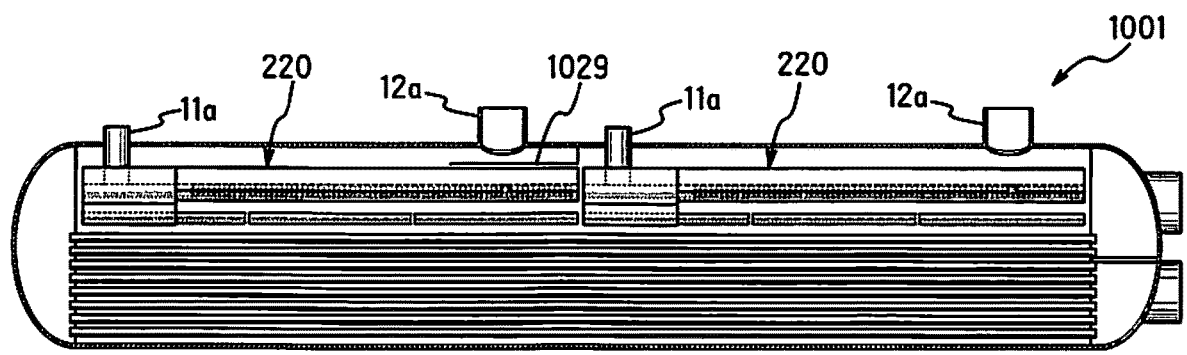
FIG. 24 is a simplified longitudinal cross sectional view of a heat exchanger and distributor in accordance with a tenth embodiment of the present invention, as taken along a section line like 6-6 in FIG. 3.

Referring now to FIG. 24, an evaporator 1001 having a baffle plate 1029 disposed under the central most shell refrigerant vapor outlet 12a in accordance with a tenth embodiment will now be explained in more detail. The evaporator 1001 is identical to the evaporator 901 of the ninth embodiment, except for the presence of the baffle plate 1029 and the divider 933 is removed. The baffle plate 1029 reduces the prevalence of refrigerant flowing from the adjacent distributor from flowing directly to the shell refrigerant vapor outlet 12a disposed above the baffle plate 1029. Therefore it will be apparent to those skilled in the art from this disclosure that the descriptions and illustrations of the first, second and ninth embodiments also apply to this tenth embodiment, except as explained and illustrated herein. Moreover, parts of this tenth embodiment that are identical to parts of the first and/or second embodiments will use the same reference numbers and/or reference numerals will not be included. However, it will be apparent to those skilled in the art from this disclosure that only modified and/or new parts of this tenth embodiment need to be given reference numerals, and that reference numerals of the first and/or second embodiments will only be included to the extent necessary to understand the tenth embodiment.

Eleventh Embodiment

Figure 25:
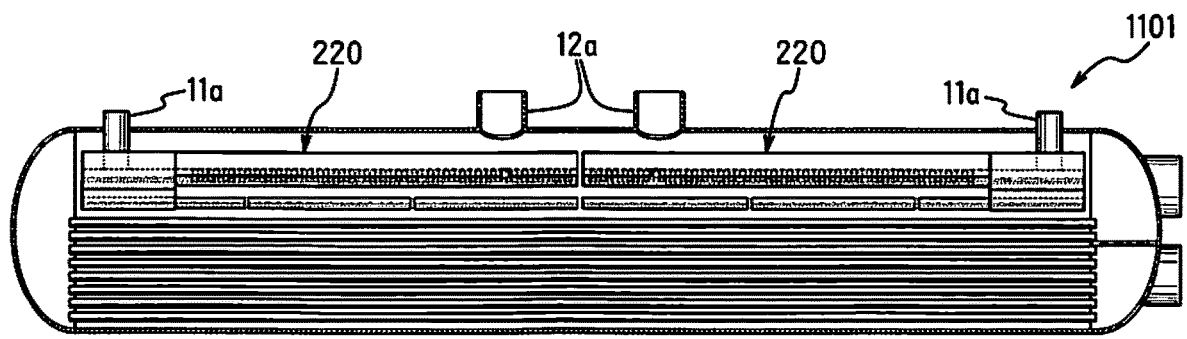
FIG. 25 is a simplified longitudinal cross sectional view of a heat exchanger and distributor in accordance with a eleventh embodiment of the present invention, as taken along a section line like 6-6 in FIG. 3.

Referring now to FIG. 25, an evaporator 1101 in accordance with an eleventh embodiment will now be explained in more detail. The evaporator 1101 is identical to the evaporator 901 of the ninth embodiment, except the distributors 220 are positioned as mirror images of each other, i.e., the refrigerant inlets 11a are disposed at opposite ends and the shell refrigerant outlets 12a are both generally centrally disposed, and the divider 933 is removed. Therefore it will be apparent to those skilled in the art from this disclosure that the descriptions and illustrations of the first, second and ninth embodiments also apply to this eleventh embodiment, except as explained and illustrated herein. Moreover, parts of this eleventh embodiment that are identical to parts of the first and/or second embodiments will use the same reference numbers and/or reference numerals will not be included. However, it will be apparent to those skilled in the art from this disclosure that only modified and/or new parts of this eleventh embodiment need to be given reference numerals, and that reference numerals of the first and/or second embodiments will only be included to the extent necessary to understand the eleventh embodiment.

Twelfth Embodiment

Figure 26:
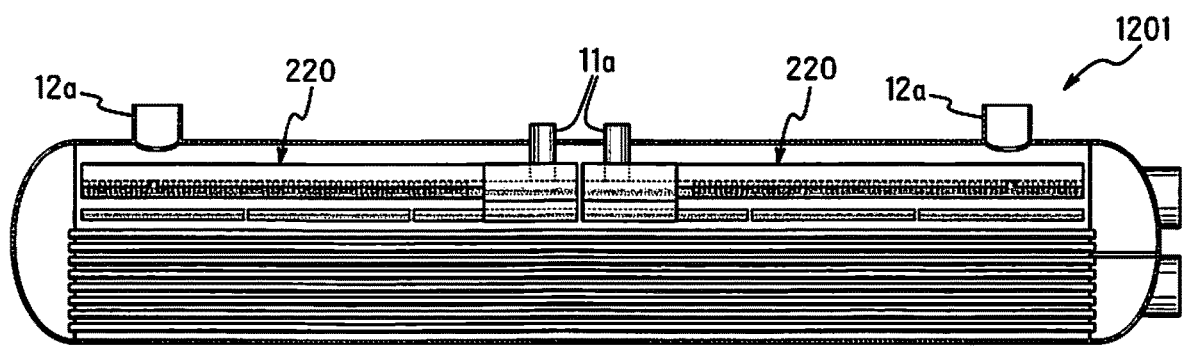
FIG. 26 is a simplified longitudinal cross sectional view of a heat exchanger and distributor in accordance with an twelfth embodiment of the present invention, as taken along a section line like 6-6 in FIG. 3.

Referring now to FIG. 26, an evaporator 1201 in accordance with an eleventh embodiment will now be explained in more detail. The evaporator 1201 is identical to the evaporator 901 of the ninth embodiment, except the distributors 220 are mirror images of each other, i.e., the refrigerant inlets 11a are centrally disposed and the refrigerant outlets 12a are both disposed at opposite ends of the shell, and the divider 933 is removed. In other words, this embodiment is an opposite mirror image of the eleventh embodiment. Therefore it will be apparent to those skilled in the art from this disclosure that the descriptions and illustrations of the first, second and ninth embodiments also apply to this twelfth embodiment, except as explained and illustrated herein. Moreover, parts of this twelfth embodiment that are identical to parts of the first and/or second embodiments will use the same reference numbers and/or reference numerals will not be included. However, it will be apparent to those skilled in the art from this disclosure that only modified and/or new parts of this twelfth embodiment need to be given reference numerals, and that reference numerals of the first and/or second embodiments will only be included to the extent necessary to understand the twelfth embodiment.

Thirteenth Embodiment

Figure 27:
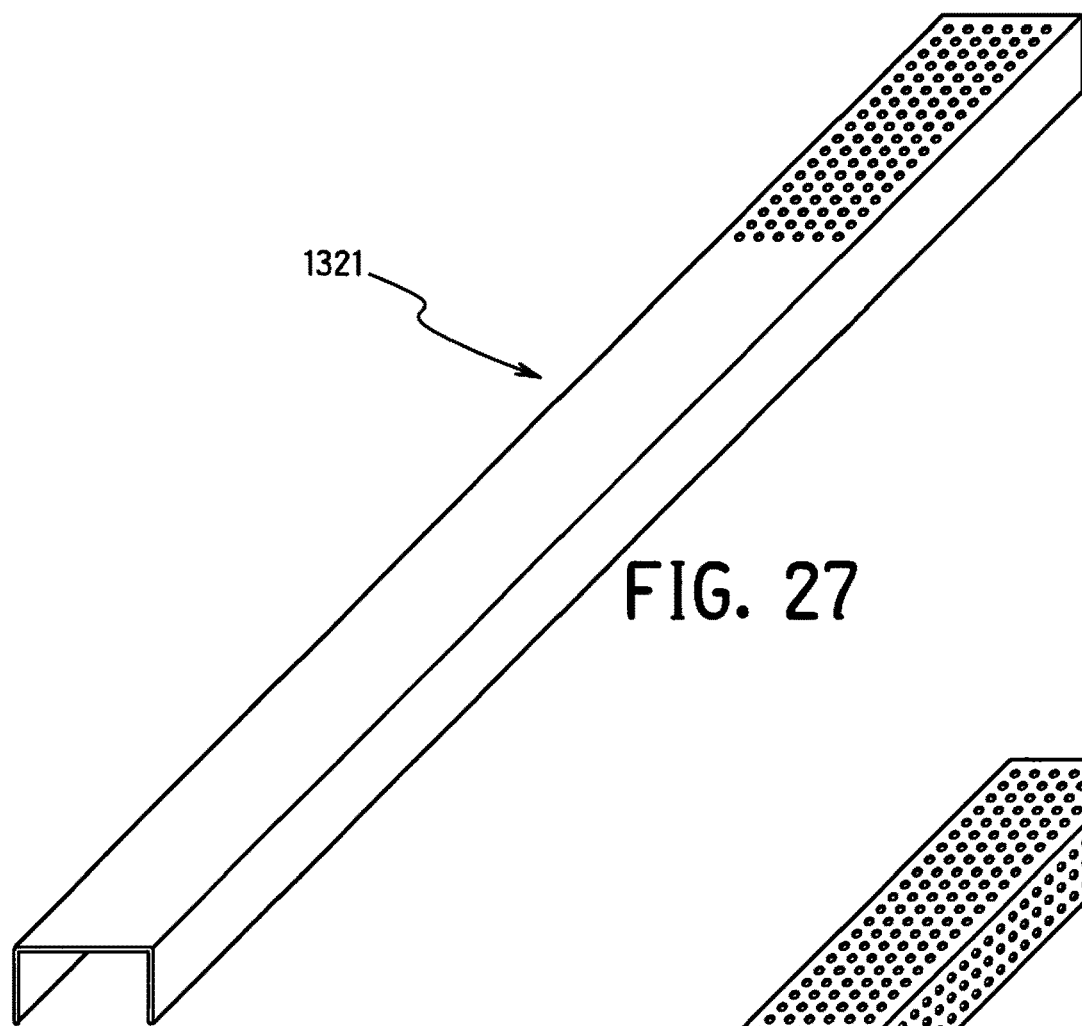
FIG. 27 is a perspective view of modified inlet channel part in accordance with a thirteenth embodiment of the present invention.

Referring now to FIG. 27, a modified inlet channel part 1321 is illustrated with a modified pattern of holes. This modified inlet channel part 1321 can be used in place of the inlet channel part 21 of any of the preceding embodiments. Holes are only formed in the top at a remote end.

Fourteenth Embodiment

Figure 28:
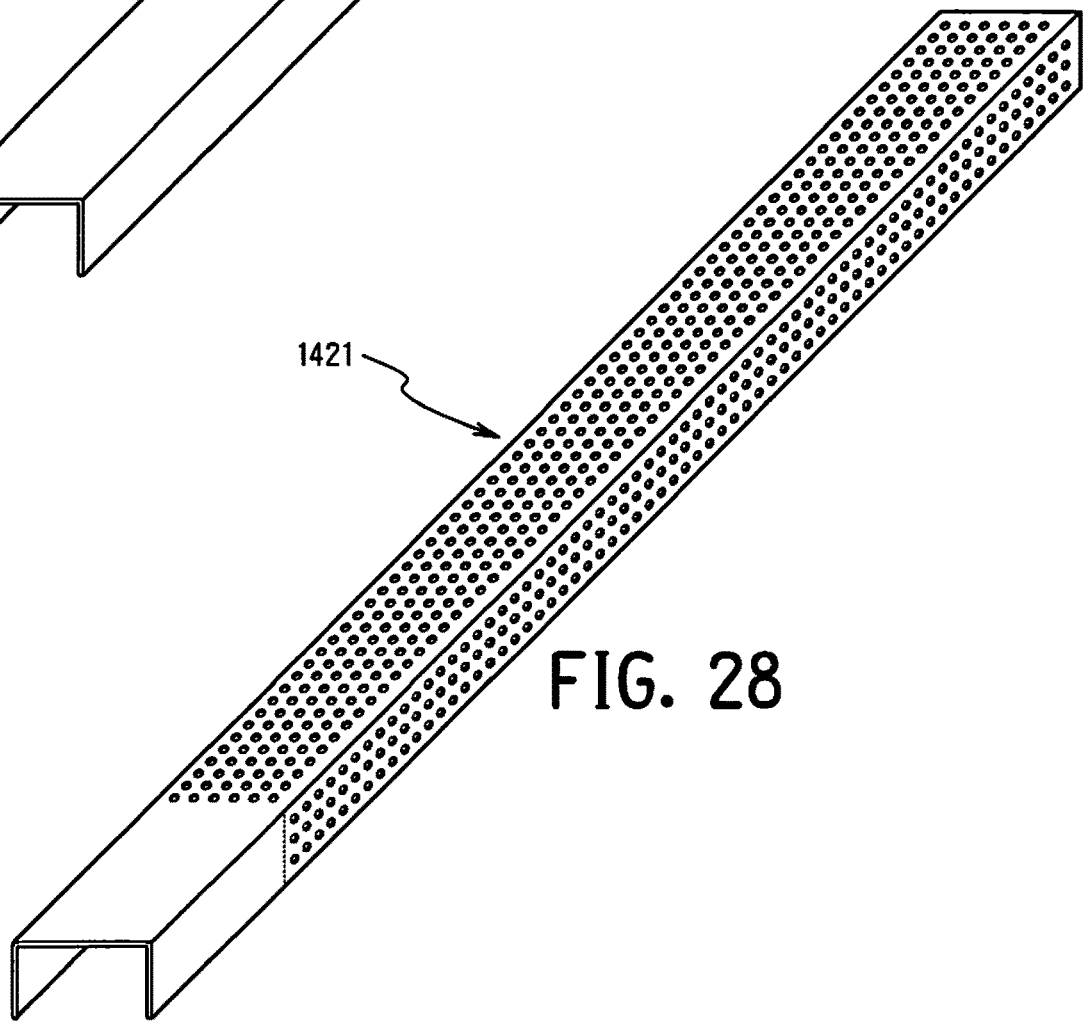
FIG. 28 is a perspective view of modified inlet channel part in accordance with a fourteenth embodiment of the present invention.

Referring now to FIG. 28, a modified inlet channel part 1421 is illustrated with a modified pattern of holes. This modified inlet channel part 1421 can be used in place of the inlet channel part 21 of any of the preceding embodiments. Holes are formed in both sides (only one shown) and the top.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiments, the following directional terms "upper", "lower", "above", "downward", "vertical", "horizontal", "below" and "transverse" as well as any other similar directional terms refer to those directions of an evaporator when a longitudinal center axis thereof is oriented substantially horizontally as shown in FIGS. 6 and 7. Accordingly, these terms, as utilized to describe the present invention should be interpreted relative to an evaporator as used in the normal operating position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A heat exchanger adapted to be used in a vapor compression system, the heat exchanger comprising:
    a shell having a refrigerant inlet that at least liquid refrigerant flows therethrough and a shell refrigerant vapor outlet, with the longitudinal center axis of the shell extending parallel to a horizontal plane;
    a refrigerant distributor connected to the refrigerant inlet and disposed within the shell, the refrigerant distributor extending longitudinally within the shell and including a first inner distributor casing and a second outer distributor casing,
    the first inner distributor casing being disposed within the second outer distributor casing, the first inner distributor casing being connected to the refrigerant inlet, and the first inner distributor casing being configured to distribute refrigerant into an interior space of the second outer distributor casing along a longitudinal length of the second outer distributor casing,
    the second outer distributor casing including a first tray part extending longitudinally along the first inner distributor casing and a second canopy part extending longitudinally along the first inner distributor casing, the first tray part and the second canopy part being connected to each other on lateral sides of the refrigerant distributor;
    the refrigerant distributor having at least one liquid refrigerant distribution opening that distributes liquid refrigerant and a refrigerant vapor distribution outlet opening longitudinally spaced from the shell refrigerant vapor outlet, the refrigerant vapor distribution outlet opening being defined by a difference in longitudinal lengths of an upper surface of the first tray part and a lower surface of the second canopy part, the refrigerant vapor distribution outlet opening being disposed at an end of a horizontal channel defined by an upper surface of an upper portion of the first inner distributor casing and the lower surface of the second canopy part of the second outer distributor casing; and
    a tube bundle disposed inside of the shell below the refrigerant distributor so that the liquid refrigerant discharged from the refrigerant distributor is supplied to the tube bundle,
    the refrigerant distributor including a shroud plate at least partially overlying the refrigerant vapor distribution outlet opening, the shroud plate having a top shroud plate and a pair of side shroud plates extending downwardly from the top shroud plate to form a substantially inverted U shaped configuration, and
    each of the side shroud plates including a tab extending upwardly from a lower end thereof to form a V-channel, the tabs extending upwardly toward each other.

2. A heat exchanger adapted to be used in a vapor compression system, the heat exchanger comprising:
    a shell having a refrigerant inlet that at least liquid refrigerant flows therethrough and a shell refrigerant vapor outlet, with the longitudinal center axis of the shell extending parallel to a horizontal plane;
    a refrigerant distributor connected to the refrigerant inlet and disposed within the shell, the refrigerant distributor having at least one liquid refrigerant distribution opening that distributes liquid refrigerant and a refrigerant vapor distribution outlet opening longitudinally spaced from the shell refrigerant vapor outlet; and
    a tube bundle disposed inside of the shell below the refrigerant distributor so that the liquid refrigerant discharged from the refrigerant distributor is supplied to the tube bundle,
    the refrigerant distributor extending longitudinally within the shell and including a first inner distributor casing and a second outer distributor casing,
    the first inner distributor casing being disposed within the second outer distributor casing, the first inner distributor casing being connected to the refrigerant inlet, and the first inner distributor casing being configured to distribute refrigerant into an interior space of the second outer distributor casing along a longitudinal length of the second outer distributor casing,
    the second outer distributor casing including a first tray part extending longitudinally along the first inner distributor casing and a second canopy part extending longitudinally along the first inner distributor casing, the first tray part and the second canopy part being connected to each other on lateral sides of the refrigerant distributor, and the second outer distributor casing having the at least one liquid refrigerant distribution opening that distributes liquid refrigerant, and the second outer distributor casing having the refrigerant vapor distribution outlet opening, the refrigerant vapor distribution outlet opening being defined by a difference in longitudinal lengths of an upper surface of the first tray part and a lower surface of the second canopy part, the refrigerant vapor distribution outlet opening being disposed at an end of a horizontal channel defined by an upper surface of an upper portion of the first inner distributor casing and the lower surface of the second canopy part of the second outer distributor casing, and the first inner distributor casing having at least one transverse baffle plate disposed therein, an upper end of the baffle plate being spaced from an upper, inner surface of the first inner distributor casing.

3. A heat exchanger adapted to be used in a vapor compression system, the heat exchanger comprising:

a shell having a refrigerant inlet that at least liquid refrigerant flows therethrough and a shell refrigerant vapor outlet, with the longitudinal center axis of the shell extending parallel to a horizontal plane;

a refrigerant distributor connected to the refrigerant inlet and disposed within the shell, the refrigerant distributor having at least one liquid refrigerant distribution opening that distributes liquid refrigerant and a refrigerant vapor distribution outlet opening; and a tube bundle disposed inside of the shell below the refrigerant distributor so that the liquid refrigerant discharged from the refrigerant distributor is supplied to the tube bundle, an entirety of the refrigerant vapor distribution outlet opening being longitudinally spaced from the shell refrigerant vapor outlet, the refrigerant distributor extending longitudinally within the shell and including a first inner distributor casing and a second outer distributor casing, the first inner distributor casing being disposed within the second outer distributor casing, the first inner distributor casing being connected to the refrigerant inlet, and the first inner distributor casing being configured to distribute refrigerant into an interior space of the second outer distributor casing along a longitudinal length of the second outer distributor casing, the second outer distributor casing including a first tray part extending longitudinally along the first inner distributor casing and a second canopy part extending longitudinally along the first inner distributor casing, the first tray part and the second canopy part being connected to each other on lateral sides of the refrigerant distributor, and the second outer distributor casing having the at least one liquid refrigerant distribution opening that distributes liquid refrigerant, and the second outer distributor casing having the refrigerant vapor distribution outlet opening, the refrigerant vapor distribution outlet opening being defined by a difference in longitudinal lengths of an upper surface of the first tray part and a lower surface of the second canopy part, the refrigerant vapor distribution outlet opening being disposed at an end of a horizontal channel defined by an upper surface of an upper portion of the first inner distributor casing and the lower surface of the second canopy part of the second outer distributor casing.

4. The heat exchanger according to claim 3, wherein the shell refrigerant vapor outlet is separate from the refrigerant vapor distribution outlet opening of distributor so that refrigerant vapor exiting the refrigerant vapor distribution outlet opening flows into an interior of the shell before flowing out of the shell refrigerant vapor outlet.

5. The heat exchanger according to claim 3, wherein the refrigerant vapor distribution outlet opening has a longitudinal length less than one half of an overall longitudinal length of the refrigerant distributor.

6. The heat exchanger according to claim 3, wherein a longitudinal space between the refrigerant vapor distribution outlet opening and the shell refrigerant vapor outlet is at least 25% of an overall longitudinal length of the refrigerant distributor.

7. The heat exchanger according to claim 3, wherein the refrigerant vapor distribution outlet opening is closer to the refrigerant inlet than to the shell refrigerant vapor outlet.

8. The heat exchanger according to claim 3, wherein the refrigerant inlet is disposed longitudinally closer to a first longitudinal end of the refrigerant distributor than to a second longitudinal end of the refrigerant distributor.

9. The heat exchanger according to claim 8, wherein the shell refrigerant vapor outlet is disposed longitudinally closer to the second longitudinal end of the refrigerant distributor than to the first longitudinal end of the refrigerant distributor.

10. The heat exchanger according to claim 8, wherein the shell refrigerant vapor outlet is equally longitudinally spaced from the first and second longitudinal ends of the refrigerant distributor.

11. The heat exchanger according to claim 3, wherein the refrigerant distributor includes a shroud plate at least partially overlying the refrigerant vapor distribution outlet opening.

12. The heat exchanger according to claim 11, wherein the shroud plate has a top shroud plate and a pair of side shroud plates extending downwardly from the top shroud plate to form an inverted U shaped configuration.

13. The heat exchanger according to claim 3, wherein the first inner distributor casing has at least one first inner distribution opening formed in at least one of a bottom part, a pair of side parts and a top part of the first inner distributor casing.

14. The heat exchanger according to claim 13, wherein the at least one first inner distribution opening is formed in the pair of side parts of the first inner distributor casing.

15. The heat exchanger according to claim 3, wherein the first tray part has the at least one liquid refrigerant distribution opening formed therein at a location below a vertical location of the refrigerant vapor distribution outlet opening.

16. The heat exchanger according to claim 15, wherein an inverted U shaped channel is attached longitudinally to the first tray part to form the first inner distributor casing, and the inverted U shaped channel has at least one first inner distribution opening formed therein.

17. The heat exchanger according to claim 15, wherein the refrigerant distributor includes a demister disposed outside of the first inner distributor and disposed inside the second outer distributor casing.

18. The heat exchanger according to claim 17, wherein the demister is disposed in an all vapor region above the first inner distributor.

19. The heat exchanger according to claim 17, wherein the demister is disposed in a liquid vapor interface region.

20. The heat exchanger according to claim 17, wherein the demister includes a mesh plate material.

* * * * *